(12) United States Patent
Brown

(10) Patent No.: US 8,845,103 B2
(45) Date of Patent: Sep. 30, 2014

(54) GIMBALED HANDLE STABILIZING CONTROLLER ASSEMBLY

(71) Applicant: Garrett W. Brown, Philadelphia, PA (US)

(72) Inventor: Garrett W. Brown, Philadelphia, PA (US)

( * ) Notice: Subject to any disclaimer, the term of this patent is extended or adjusted under 35 U.S.C. 154(b) by 0 days.

(21) Appl. No.: 14/189,573

(22) Filed: Feb. 25, 2014

(65) Prior Publication Data

US 2014/0185013 A1     Jul. 3, 2014

Related U.S. Application Data

(63) Continuation of application No. 12/899,084, filed on Oct. 6, 2010, now Pat. No. 8,714,744.

(60) Provisional application No. 61/292,322, filed on Jan. 5, 2010, provisional application No. 61/249,419, filed on Oct. 7, 2009.

(51) Int. Cl.
| F16M 11/22 | (2006.01) |
| G03B 17/00 | (2006.01) |
| G03B 17/56 | (2006.01) |
| F16M 13/04 | (2006.01) |

(52) U.S. Cl.
CPC ............. *G03B 17/561* (2013.01); *F16M 13/04* (2013.01)
USPC ............ 352/243; 396/421; 396/428; 348/373

(58) Field of Classification Search
USPC ............. 352/243; 396/55, 421, 428; 348/373, 348/376; 248/274.1, 660, 585, 542; 318/649, 648, 638; 89/41.05, 41.02
See application file for complete search history.

(56) References Cited

U.S. PATENT DOCUMENTS

| 467,622 | A | * | 1/1892 | Oswald | 278/42 |
| 2,425,602 | A | * | 8/1947 | Drescher | 248/114 |
| 2,688,456 | A | * | 9/1954 | Jensen | 248/694 |
| 2,707,882 | A | * | 5/1955 | Kent | 74/5.4 |
| 2,960,875 | A | * | 11/1960 | Elwell | 74/5.1 |
| 3,249,326 | A | * | 5/1966 | Reister | 244/175 |
| 3,333,613 | A | * | 8/1967 | Bosse | 81/57.4 |
| 3,449,769 | A | * | 6/1969 | Mizen | 623/26 |
| 3,521,369 | A | * | 7/1970 | Jones | 33/370 |
| 3,576,133 | A | * | 4/1971 | Krupick et al. | 74/5 F |
| 3,638,502 | A | * | 2/1972 | Leavitt et al. | 74/5.34 |
| 3,694,888 | A | * | 10/1972 | Bosse | 29/240 |
| 3,756,549 | A | * | 9/1973 | Lange | 248/123.2 |
| 3,917,200 | A | * | 11/1975 | Johnson | 248/647 |
| 4,017,168 | A | * | 4/1977 | Brown | 352/243 |
| 4,033,541 | A | * | 7/1977 | Malueg | 248/550 |
| 4,156,512 | A | * | 5/1979 | Brown | 248/586 |
| 4,158,490 | A | * | 6/1979 | Gottschalk et al. | 352/243 |
| 4,206,983 | A | * | 6/1980 | Nettman et al. | 352/243 |
| 4,270,387 | A | * | 6/1981 | Hoffman | 73/504.07 |

(Continued)

*Primary Examiner* — William C Dowling
(74) *Attorney, Agent, or Firm* — Schnader Harrison Segal & Lewis LLP

(57) ABSTRACT

A stabilizing controller to balance, support and orient a device. The stabilizing controller includes a gimbal assembly positioned at the center of balance of the stabilizing controller with the device attached, A handle is disposed around the gimbal assembly. A center post is coincident with at least a portion of the centerline of the gimbal apparatus and has a longitudinal balancing axis Z. Motion about at least one of the mutually perpendicular X-axis, Y-axis, and the Z-axis is isolated from the motion of the other axes via one or more assemblies comprising resilient components.

22 Claims, 21 Drawing Sheets

(56) References Cited

U.S. PATENT DOCUMENTS

| | | | | |
|---|---|---|---|---|
| 4,318,522 A * | 3/1982 | Appleberry | ............... | 248/179.1 |
| 4,318,584 A * | 3/1982 | Ando et al. | ............... | 359/401 |
| 4,341,452 A * | 7/1982 | Korling | ............... | 396/428 |
| 4,474,439 A * | 10/1984 | Brown | ............... | 352/243 |
| RE32,213 E * | 7/1986 | Brown | ............... | 352/243 |
| 4,610,560 A * | 9/1986 | Miller | ............... | 403/119 |
| 4,625,938 A * | 12/1986 | Brown | ............... | 248/550 |
| 4,676,622 A * | 6/1987 | Hortenhuber | ............... | 396/428 |
| 4,685,649 A * | 8/1987 | McKay | ............... | 248/594 |
| 4,710,819 A * | 12/1987 | Brown | ............... | 348/144 |
| 4,756,655 A * | 7/1988 | Jameson | ............... | 414/2 |
| 4,946,272 A * | 8/1990 | Brown | ............... | 352/243 |
| 4,989,466 A * | 2/1991 | Goodman | ............... | 74/5.22 |
| 5,098,182 A * | 3/1992 | Brown | ............... | 352/243 |
| 5,109,736 A * | 5/1992 | Dixon | ............... | 81/57.4 |
| D329,449 S * | 9/1992 | Brown et al. | ............... | D16/243 |
| 5,163,649 A * | 11/1992 | Schehr | ............... | 248/287.1 |
| 5,229,798 A * | 7/1993 | Brown | ............... | 352/243 |
| 5,389,987 A * | 2/1995 | Corbeil et al. | ............... | 396/420 |
| D358,832 S * | 5/1995 | Lenney et al. | ............... | D16/242 |
| 5,419,528 A * | 5/1995 | Carter et al. | ............... | 248/585 |
| 5,509,630 A * | 4/1996 | Bringuier | ............... | 248/178.1 |
| 5,537,205 A * | 7/1996 | Costa et al. | ............... | 356/250 |
| 5,544,554 A * | 8/1996 | Brightly | ............... | 81/57.4 |
| 5,579,071 A * | 11/1996 | Wetzel et al. | ............... | 396/428 |
| 5,609,316 A * | 3/1997 | Tigliev | ............... | 248/123.11 |
| 5,685,682 A * | 11/1997 | Glime et al. | ............... | 411/510 |
| 5,742,857 A * | 4/1998 | Nanba et al. | ............... | 396/319 |
| 5,742,859 A * | 4/1998 | Acker | ............... | 396/419 |
| 5,752,112 A * | 5/1998 | Paddock et al. | ............... | 396/421 |
| 5,797,054 A * | 8/1998 | Paddock et al. | ............... | 396/421 |
| 5,868,031 A * | 2/1999 | Kokush et al. | ............... | 74/5.34 |
| 5,963,749 A * | 10/1999 | Nicholson | ............... | 396/421 |
| 6,030,130 A * | 2/2000 | Paddock et al. | ............... | 396/421 |
| 6,149,506 A * | 11/2000 | Duescher | ............... | 451/59 |
| 6,188,849 B1 * | 2/2001 | Staicouras | ............... | 396/421 |
| 6,293,676 B1 * | 9/2001 | Holway | ............... | 352/243 |
| 6,377,011 B1 * | 4/2002 | Ben-Ur | ............... | 318/566 |
| 6,393,708 B1 * | 5/2002 | Culver et al. | ............... | 33/397 |
| 6,554,500 B2 * | 4/2003 | Melitopoulos | ............... | 396/428 |
| 6,578,967 B1 * | 6/2003 | Paddock et al. | ............... | 352/243 |
| 6,606,456 B2 * | 8/2003 | Fujinaga | ............... | 396/55 |
| 6,663,299 B1 * | 12/2003 | Shupak | ............... | 396/422 |
| 6,701,081 B1 * | 3/2004 | Dwyer et al. | ............... | 396/329 |
| 6,711,972 B1 * | 3/2004 | Joyner et al. | ............... | 81/57.4 |
| 6,808,324 B2 * | 10/2004 | McKay | ............... | 396/421 |
| 6,857,787 B1 * | 2/2005 | Meier et al. | ............... | 384/619 |
| 6,858,003 B2 * | 2/2005 | Evans et al. | ............... | 600/103 |
| 7,000,883 B2 * | 2/2006 | Mercadal et al. | ............... | 248/660 |
| 7,014,402 B2 * | 3/2006 | Kessler | ............... | 410/155 |
| 7,055,789 B2 * | 6/2006 | Libbey et al. | ............... | 248/278.1 |
| 7,065,888 B2 * | 6/2006 | Jaklitsch et al. | ............... | 33/286 |
| 7,209,176 B2 * | 4/2007 | Chapman | ............... | 348/373 |
| 7,314,438 B1 * | 1/2008 | Clark et al. | ............... | 482/126 |
| 7,371,028 B2 * | 5/2008 | Gordon et al. | ............... | 403/373 |
| 7,625,090 B2 * | 12/2009 | Brown et al. | ............... | 352/243 |
| 7,642,741 B2 * | 1/2010 | Sidman | ............... | 318/649 |
| 7,658,677 B2 * | 2/2010 | Needes et al. | ............... | 464/30 |
| 7,931,412 B2 * | 4/2011 | Brown | ............... | 396/421 |
| 8,029,197 B2 * | 10/2011 | McKay | ............... | 396/421 |
| 8,100,591 B2 * | 1/2012 | Chapman et al. | ............... | 396/428 |
| 8,142,083 B2 * | 3/2012 | Brown | ............... | 396/421 |
| 8,179,078 B2 * | 5/2012 | Sidman | ............... | 318/649 |
| 8,360,661 B2 * | 1/2013 | Orf et al. | ............... | 396/421 |
| 2004/0026584 A1 * | 2/2004 | Libbey et al. | ............... | 248/278.1 |
| 2005/0023015 A1 * | 2/2005 | Argento | ............... | 173/36 |
| 2005/0052531 A1 * | 3/2005 | Kozlov et al. | ............... | 348/143 |
| 2005/0200938 A1 * | 9/2005 | Greywall | ............... | 359/290 |
| 2006/0101704 A1 * | 5/2006 | Ayoub | ............... | 43/23 |
| 2006/0231700 A1 * | 10/2006 | Orf et al. | ............... | 248/187.1 |
| 2006/0262274 A1 * | 11/2006 | Brown et al. | ............... | 352/243 |
| 2007/0019330 A1 * | 1/2007 | Wolfersberger | ............... | 360/244 |
| 2007/0050139 A1 * | 3/2007 | Sidman | ............... | 701/220 |
| 2007/0080275 A1 * | 4/2007 | Stachowski et al. | ............... | 248/323 |
| 2007/0127912 A1 * | 6/2007 | Jones et al. | ............... | 396/428 |
| 2008/0034954 A1 * | 2/2008 | Grober | ............... | 89/41.05 |
| 2008/0046122 A1 * | 2/2008 | Manzo et al. | ............... | 700/245 |
| 2009/0086015 A1 * | 4/2009 | Larsen et al. | ............... | 348/46 |
| 2009/0086355 A1 * | 4/2009 | Ohno et al. | ............... | 360/31 |
| 2009/0257741 A1 * | 10/2009 | Greb et al. | ............... | 396/55 |
| 2010/0124414 A1 * | 5/2010 | Brown | ............... | 396/421 |
| 2010/0238345 A1 * | 9/2010 | Greb et al. | ............... | 348/373 |
| 2010/0278523 A1 * | 11/2010 | Brown | ............... | 396/421 |
| 2011/0211164 A1 * | 9/2011 | Monroe et al. | ............... | 352/243 |
| 2011/0221900 A1 * | 9/2011 | Reich | ............... | 348/144 |
| 2012/0002062 A1 * | 1/2012 | Brown et al. | ............... | 348/208.99 |
| 2012/0081670 A1 * | 4/2012 | Greaves et al. | ............... | 352/243 |
| 2012/0106941 A1 * | 5/2012 | Greaves et al. | ............... | 396/421 |

\* cited by examiner

GIMBALED HANDLE STABILIZING CONTROLLER ASSEMBLY

This application is a continuation of U.S. patent application Ser. No. 12/899,084, filed Oct. 6, 2010, which claims priority to U.S. provisional applications 61/249,419, filed Oct. 7, 2009 and 61/292,322, filed Jan. 5, 2010, all aforementioned applications of which are incorporated herein by reference.

BACKGROUND OF THE INVENTION

This invention relates generally to equipment stabilizing controller assemblies, and is applicable to image capture devices.

Mobile film or video cameras typically require angular and spatial stability in order to obtain smooth, high-quality results.

The original Steadicam® portable camera stabilizing device, which has become a standard in the TV and movie industry, was invented by Garrett Brown, co-inventor of the present invention, and developed to permit stable videography or cinematography by an ambulatory operator. The trademark Steadicam® continues to be used to identify various stabilizers, not all of which necessarily constitute prior art.

FIG. 1 is a side elevation showing a prior art camcorder stabilizer 1 and camcorder 2 with its associated handle 5 and gimbal assembly 45 balanced so that the center of gravity of the entire structure is located just below the center of gimbal 45. In this prior art configuration, gimbal assembly 45 is above handle 5. Handle 5 and gripping surfaces 41, 42 are shown being held by three fingers of the operator's hand, while the thumb and index finger lightly contact the 'guide' surfaces 40 and 46. Note that two hands can also be employed: one holding the handle for support and the thumb and two fingers of the other hand lightly contacting the guide surfaces 40, 46. Arcuate upper and lower support structures 6 and 11 position counterweights 10, 12 so that the center of balance of stabilizer 1 is located approximately at or just below the center of gimbal assembly 45. This arcuate structure is necessary because the interrupted handle and gimbal, as positioned in the configuration shown, cannot accommodate a central post for positioning counterweight masses at selected distances directly below the gimbal.

FIG. 2 is a frontal elevation of gimbal assembly 45 showing outer gimbal ring structure 56, associated gimbal ring 57, post assembly 58 and pan bearings 59a,b. which provide three axes of rotational isolation from handle and gripping surfaces 41, 42. Guide surfaces 40 and 46, just above and surrounding gimbal 45, provide surfaces that can be engaged by an operator's thumb and forefingers to delicately control and orient the apparatus.

FIG. 10 is an isometric elevation of another prior art stabilizer 50. This stabilizer has a center post 71 that passes through the center of a gimbal apparatus 77. A handle 75 is disposed along the side of center post 71. A camera 80 is counterbalanced by weights 82, 83, which are positioned on mounting structure 85.

What is needed is a novel handle-and-gimbal combination that permits even an untrained operator to immediately produce stable and elegant camera moves without experience, practice or special aptitude, and which controls some of the abrupt motions imparted to image-capture devices by inexperienced users.

SUMMARY OF THE INVENTION

Embodiments of the invention may reverse the logic of prior-art camera stabilizer gimbals and move the pan axis bearing from its historical innermost position among the three axes of isolation, to a novel position separated from the other two gimbal rings. Now, the axes of these two gimbal rings can be oriented to conform to the axes of camera tilt and roll. Resilient, dampening or biasing means can now be applied to operate around any or all of these pan, roll or tilt axes of rotation to bias the orientation of the camera stabilizer to a particular position with respect to a particular axis. The term "control" and forms thereof will be used herein to include bias and/or dampen and forms thereof. The resilient components can also be contoured to include a 'dead band' and any desired curve or degree of resilience or dampening force appropriate to the weight and inertia of the camera and stabilizer structure.

In an illustrative embodiments of the invention, a handle disposed at least partially around a gimbal apparatus wherein the handle is rotationally isolated from the gimbal apparatus, for example by a bearing apparatus. The innermost gimbal ring is attached via a sleeve to a central mounting post which is fixedly attached to the camera/stabilizer assembly above, and may optionally be attached to a counter-weighting structure below.

At least one resilient control component is provided to influence rotation in at least one of the three axes, such as by dampening or biasing motion. This influence or control will inhibit or prohibit rotational motion about one or more of three mutually perpendicular axes. It can dampen rotational motion or bias it to a certain position. This resilient component may be arranged to provide a small angular 'dead band' to prevent unintentional rotations due to the instability of the human hand.

The resilient component may comprise springs or compliant material segments such as foam, air bladders or an elastic polymer such as Sorbathane®. Magnets may also be incorporated into the apparatus to provide a control effect. The resilient material may be attached, for example, to the outer race of the gimbal assembly and positioned to be contacted by mechanical extensions of the inner race, to bias the camera in the pan axis when the handle is rotated sufficiently. Various other configurations, will be described herein, that accomplish control in the pan, tilt or roll axes.

Embodiments of the invention can provide a hand-held controller that may be particularly suitable for small and ultra-small imaging devices.

DESCRIPTION OF THE DRAWINGS

The invention is best understood from the following detailed description when read in conjunction with the accompanying drawings.

DETAILED DESCRIPTION OF THE INVENTION

Figure 3:
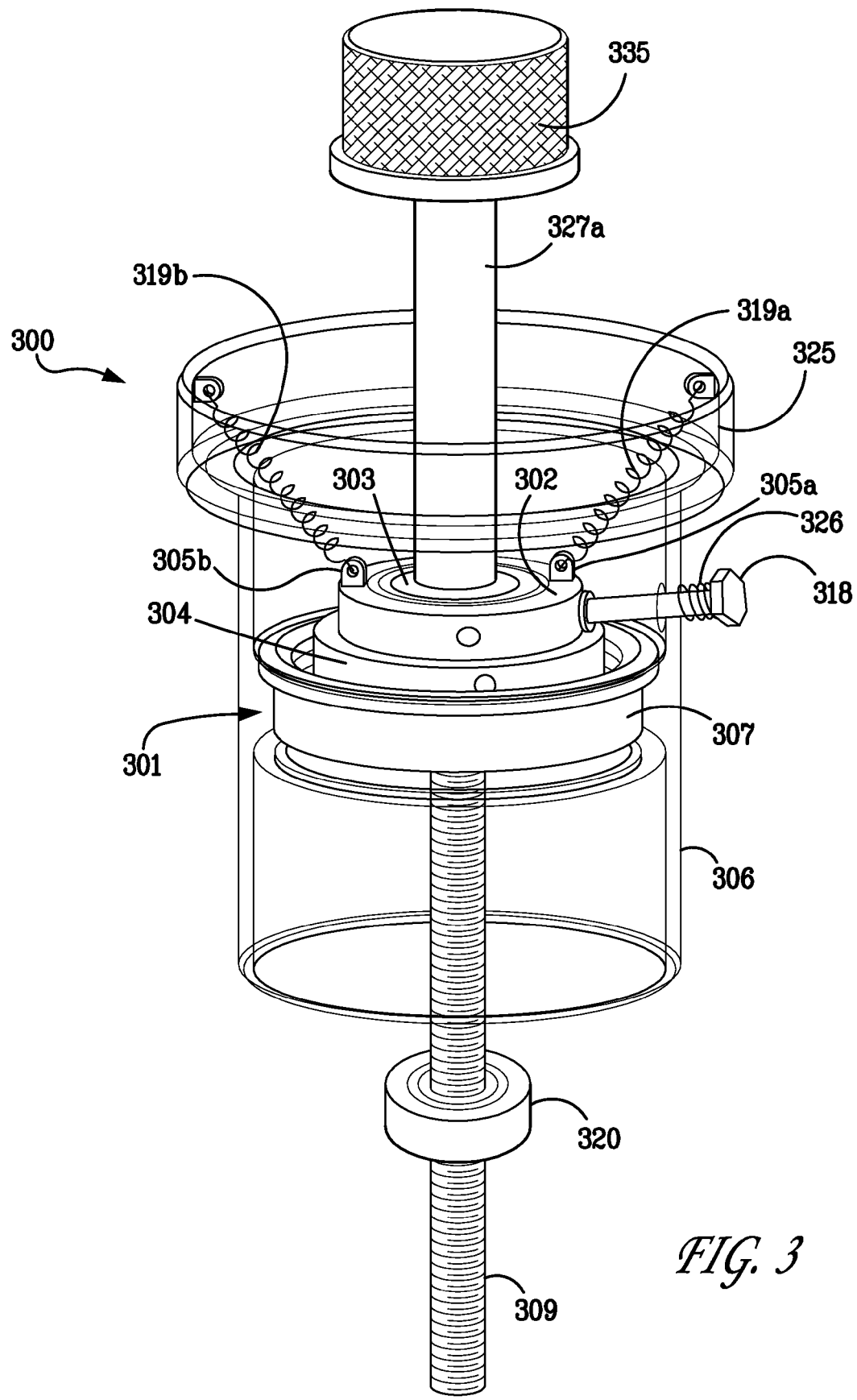
FIG. 3 is a semi-transparent view of a handle and gimbal assembly according to an illustrative embodiment of the invention.

FIG. 3 is a semi-transparent view of a combination gimbal/handle assembly 300, according to an illustrative embodiment of the invention. The assembly can be configured to be particularly suitable for heavy payloads, but can also be used for lightweight payloads. Camera platform mounting interface 335 attaches center post 309 to a camera mounting platform, such as a platform adjustable along its perpendicular X-Y top surface axes, or a non-adjustable platform. The platform can also be adjustable along the Z-axes, which is mutually perpendicular to the Z axis. Spacer 327a,b positions gimbal assembly 301 (including post mounting sleeve 303, gimbal ring 302, and outer gimbal ring 304 (identified in FIG. 5) at the center of balance of the entire camera/stabilizer structure (see FIGS. 13-15 for illustrative structures). The gimbal assembly is connected to the inner race component of pan bearing 307. The outer race component of bearing 307 is attached to handle 306 (rendered transparently). An outer gimbal ring 304 is mounted to an inner pan bearing race component of pan bearing 307 is attached at attachment points 305a,b to pan biasing resilient means (such as springs) 319a,b, which terminate at handle flange 325, preferably opposite one another. Within the limits of its travel (as curtailed by contact with the inner surface of handle 306), post 309 is isolated in the tilt and pan axes from motions of handle 306. Rotational motions applied to handle 306 twist resilient means 319a,b and bias only the subsequent rotation with respect to post 309. The 'rate', meaning the degree of force required to effect a given deflection, of resilient means 319a,b can be selected as appropriate for the mass and inertia of the stabilizer components being rotationally biased by handle 306, yet still preserve the 'dead band' of little or no rotational influence when the springs 319a,b are substantially or entirely relaxed.

Tilting and/or rolling motions can be imparted to the attitude of post 309 by, for example, employing the operator's second hand for contact with bearing assembly 320. This allows post 309 to rotate within bearing assembly 320 while limited or prohibiting post 309 to tilt or roll. Such motions bias only the tilt and/or roll axes and do not influence the camera/stabilizer's orientation in the pan axis.

Motion of handle 306 in the pan axis with respect to post 309 can be stopped by pushing button 318 to engage with outer gimbal ring 304. Spring 326 biases button 318 in a non-engaged position. This permits panning motions without the biasing of springs 319a,b for the time period for which button 318 is depressed. Other mechanisms such as various, levers, brakes, or the like that can fix the position of the handle with respect to the center post or other component with respect to which it has relative rotational motion, can be used to accomplish what button 318 does.

Figure 4:
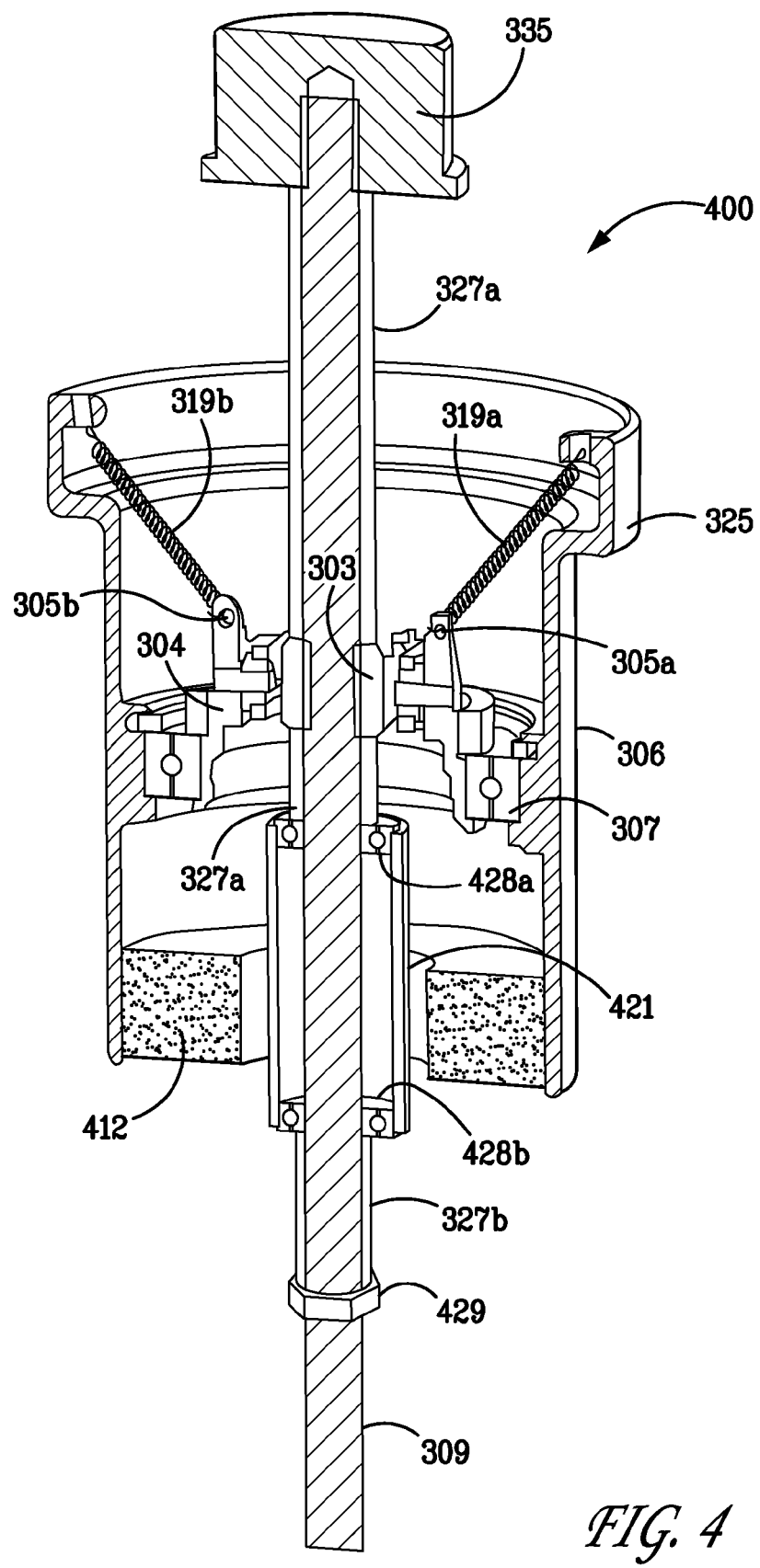
FIG. 4 is a cutaway view of a handle and gimbal assembly according to an illustrative embodiment of the invention.

FIG. 4 is a cutaway view of a combination gimbal/handle assembly 400, according to an illustrative embodiment of the invention. The assembly particularly useful for light payloads. For light payloads, use of a bearing assembly such as 320 shown in FIG. 3 and described above, to impart tilting and rolling motions to post 309 would likely over-control the orientation of lighter camera/stabilizer payloads, because the gross motions of the second hand would not be opposed (and dampened) by the inertia of the heavier payload. Illustrative embodiment 400 is similar in many respects to gimbal/handle assembly 300, but includes an alternate means for resiliently damping angular displacements about the tilt and roll axes imparted directly to handle 306. Rotation of outer post tube 421 is isolated from post 309 by means of bearings 428a,b. Tilting and/or rolling motions of handle 306 bring tube 421 in contact with tilt/roll resilient bumper ring 412, which subsequently affects the tilt or roll angle of post 309 without permitting influence on its pan orientation. Likewise, panning motions imparted to handle 306 do not influence the tilt or roll axes positions of post 309 because such motions are not transmitted because of rotating tube 421.

Note the location of two-axis gimbal assembly 301 in FIG. 3 and FIG. 4 at the approximate middle of handle 306. The gimbal assembly's placement at a greater distance from the camera mounting interface 335 compared to prior art stabilizers, requires additional counterweight below in order to position the center of balance of the entire structure, as is typical, at the pivoting center of two-axis gimbal assembly 301.

Figure 5:
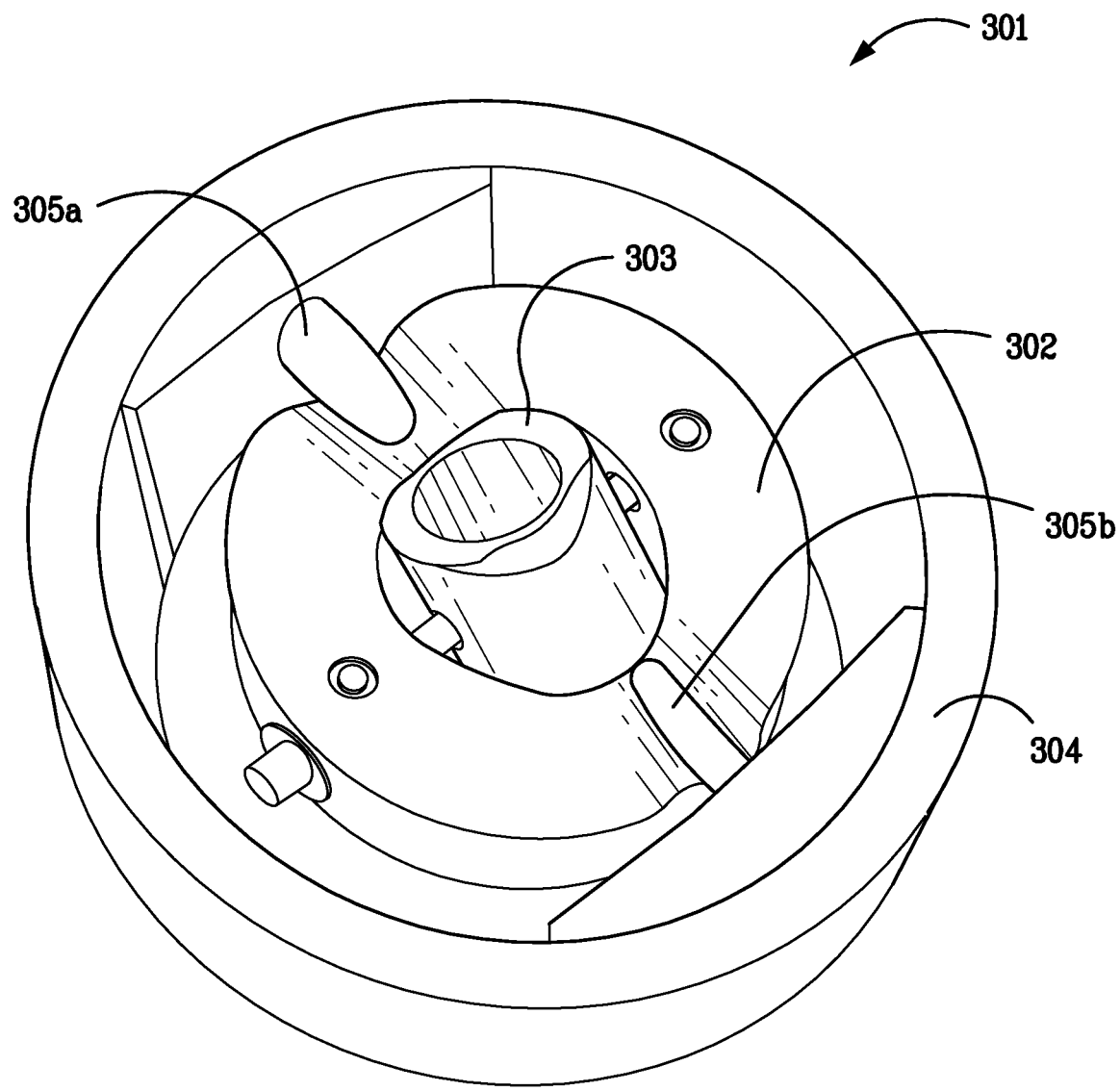
FIG. 5 is a top view of a gimbal assembly according to an illustrative embodiment of the invention.

FIG. 5 is a top perspective view of the two-axis gimbal assembly 301 according to an illustrative embodiment of the invention, such as can be used in gimbal/handle assemblies 300 and 400. Post mounting sleeve 303, which surrounds, and is locked to and positioned with respect to, post 309 by spacers 327a,b and locknut 429. Sleeve 303 is rotationally connected to gimbal ring 302 by trunnions 503a,b. Inner ring 302 is connected to outer gimbal ring 504, preferably by trunnions. The gimbal assembly permits near frictionless rotation around two axes which are preferably registered (locked) to the two 'camera operating' axes of tilt and pan for an attached camera payload. Resilient biasing means 319a,b (shown in FIGS. 3 and 4) are attached to outer gimbal ring 504 at attachment points 305a,b. Resilient biasing means 319a,b are further attached to handle 306 in order to bias the orientation of the pan axis as handle 306 is rotated.

Figure 6:
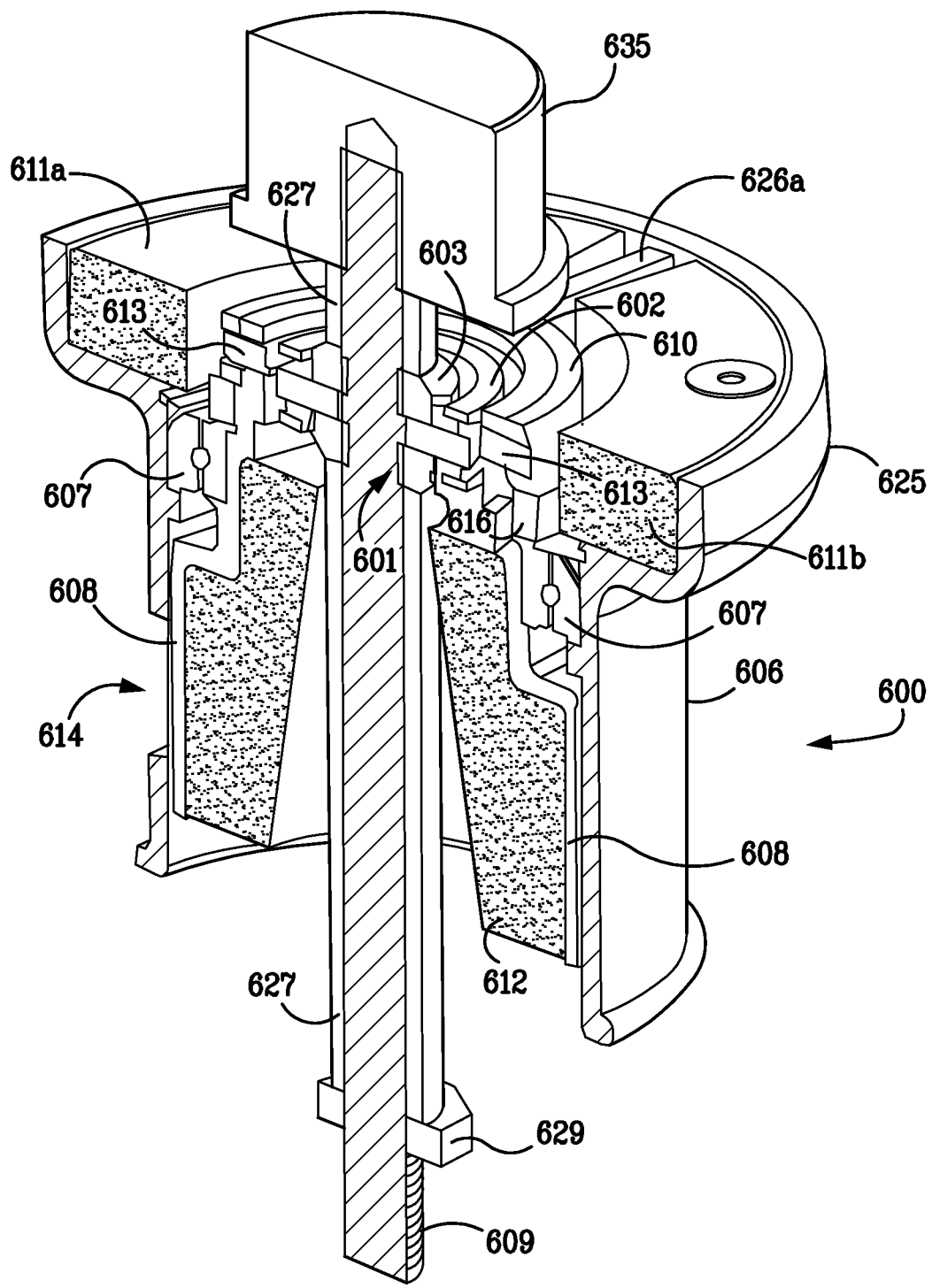
FIG. 6 is an isometric cutaway view of a combined gimbal and handle assembly according to an illustrative embodiment of the invention.
Figure 7:
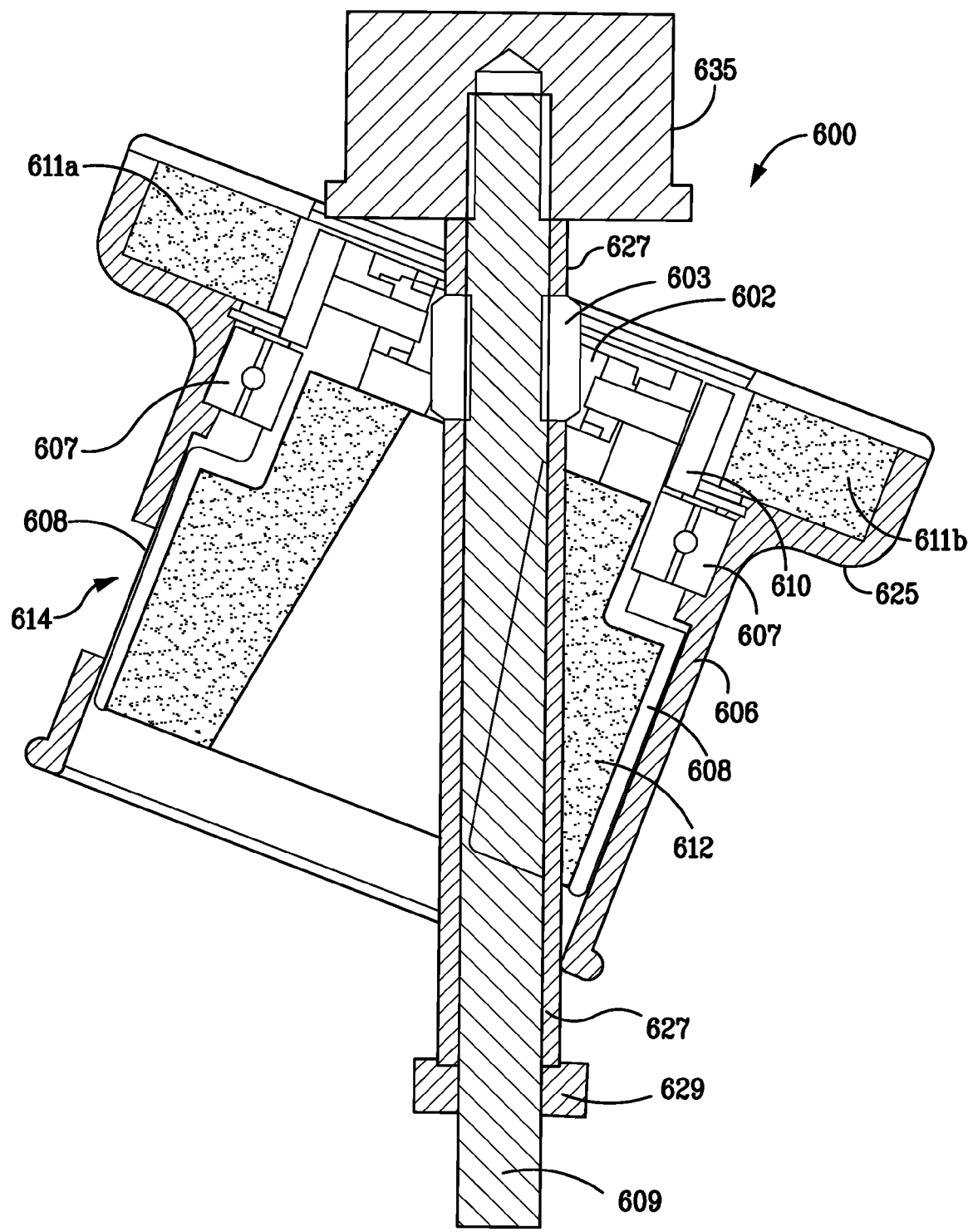
FIG. 7 is a cutaway elevation of the gimbal assembly of FIG. 6 according to an illustrative embodiment of the invention.
Figure 8:
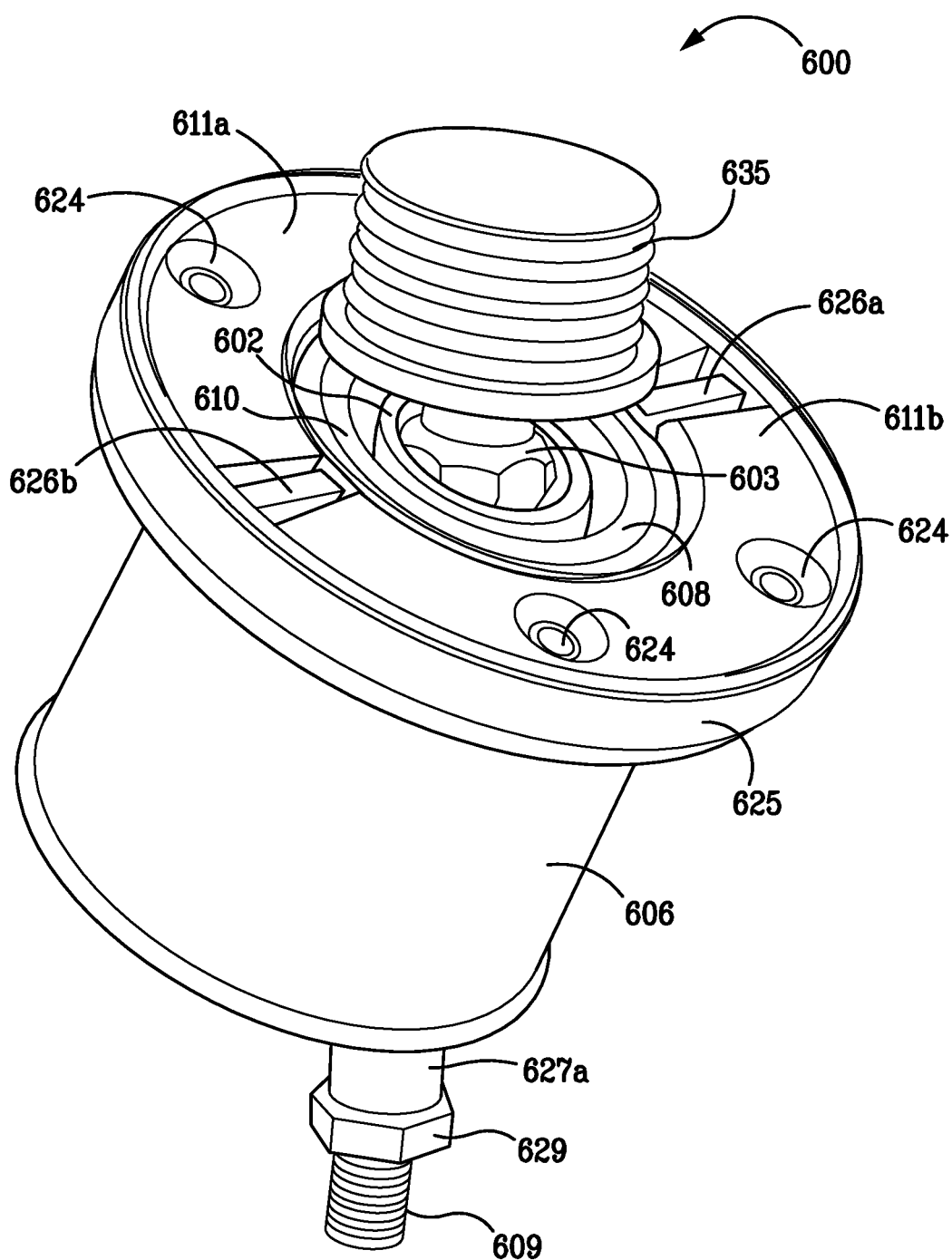
FIG. 8 is an isometric view of the gimbal assembly of FIG. 6 according to an illustrative embodiment of the invention.

FIGS. 6-8 depict a combination handle/gimbal assembly according to an illustrative embodiment of the invention. FIG. 6 is an isometric cutaway view of a combined gimbal and handle assembly 600 according to an illustrative embodiment of the invention that may be suitable for light and ultra-light payloads. FIG. 7 is a cutaway elevation of the gimbal assembly of FIG. 6 showing the center-post tilted with respect to the orientation of the outer handle. FIG. 8 is an isometric view of the gimbal assembly of FIG. 6, with the means for biasing rotations in the pan axis exposed to view. A two-axis gimbal assembly 601 is positioned near the top of center post 609 and as close as possible to camera mounting interface 635, to minimize the counterweight needed below to position the center of balance of the extended payload masses at the approximate center of two-axis gimbal 601. Inner sleeve 603 is locked in position, for example, along a threaded section of post 609, and is registered to the orientation of the camera payload by means of spacers 627 and locknut 629.

Gimbal assembly 601, is similar to assembly 301 shown in FIGS. 3-5, however, outer gimbal ring 304 has been extended downward to form tube 608. The term "tube" as used herein does not necessarily indicate a cylindrical hollow form, but includes non-circular cross-sectional shapes. Tube 608 is connected to the inner race component of pan bearing 607. Tilt-roll bumper ring 612 is disposed within tube 608, either wholly or partially. Since tube 608 and bumper ring 612 are fixed with respect to two-axis gimbal 601 and post 609, contact between spacer 627 and bumper ring 612 generally will not cause a bias in the pan axis, nor will panning motion of handle 606 bias a rotation of post 609. (This eliminates or reduces the need for rotating tube 421 as shown in FIG. 4.).

Pan resilient pads 611*a,b* are attached by mounting screws 624 within handle flange 625. Pan paddle ring 610 is attached to tube 608 by mounting screws 613, and contains at least one paddle 626*a* extending radially from paddle ring 610. Because resilient pads 611*a,b* are attached to handle 625, paddle ring 610 will inhibit rotation of handle flange 625 when resilient pads 611*a,b* come into contact with it. When no panning rotation occurs or is desired, paddles 626*a* are substantially stationary within the gaps between resilient pads 611*a,b*. Rotational displacement of handle 606 in the pan axis, however, causes resilient pads 611*a,b* to come into increasingly forceful contact with paddle 626, thereby biasing rotation of the payload in the pan axis. Although two sections of resilient pad 611*a,b* are shown in FIG. 6, various numbers of pads may be used, and various numbers of paddles. A single resilient pad is within the scope of the invention, with a single gap, within which a paddle is disposed.

Generally, the lighter the payload, the more compliant (the smaller the 'rate') the resilient pads should be to provide the desired biasing. Edges of resilient pads 611 or of the paddles 626*a,b*, can be angled or beveled to reduce the initial contact area between the pads and paddles; Thus, even with light payloads and stabilizers having negligible inertial moments, the natural vibrations inherent in manual control will not unintentionally bias the rotation to an undesirable degree.

A slot 614 handle 606 allows the operator's third finger, for example, to be pressed through handle 606 to contact the outer surface of tube 608 in order to prevent or reduce movement of tube 608 with respect to handle 606, thus prohibiting, or impeding motion about the pan axis. This can make possible sudden, or even violent panning motions that would otherwise be dampened by the rotational control mechanisms contained in the apparatus.

FIG. 7 is a cutaway elevation of the combined gimbal/handle assembly of FIG. 6 illustrating the independent biasing of the tilt and/or roll axis caused by tilting handle 606 so that spacer 627 pushes against resilient bumper ring 612. Configurations wherein spacer 627 is absent, or is segmented are also possible. The force opposing the movement of center post 609 or spacer 627 resulting from contact with bumper 612 can be progressive, as the resilient material of bumper 612 is compressed. The foam or other resilient material can be cut or molded or positioned to provide various desired progressions of forces (curve of force application). These forces can be created so that angular displacement of handle 606 relative to post 609 is dampened or cushioned against unwanted vibrations imparted by the human hand. Foam, for instance, and other non-bouncy materials like Sorbothane® can be selected and molded/formed to create the desired control, for example by imparting dampening or biasing effects. FIGS. 6 and 7 show a conical shaped bumper 612, which can reduce bouncing motions that would otherwise make tilting and holding a tilted position more difficult. As described above, bumper 612 can have various configurations. It need not extend the length of handle 606 below the gimbal apparatus 601, but can be, for example, a ring or segment of a ring disposed within the inner diameter of a portion of the length of the handle. Factors, such as desired biasing and dampening, and cost can be weighed in deciding on the most desirable bumper configuration. Resilient bumper material can make tilting actions easier than with prior-art gimbals.: Prior art stabilizers required careful 'trimming' (balancing) so that the hand did not need to apply continuous force to maintain a desired angle of tilt and/or roll. This was necessary because the human hand has difficulty exerting small consistent forces that are often required to maintain a given tilt angle for certain support apparatuses and payloads. For illustrative embodiments of the invention, handle 606 can be held with various degrees of firmness, for example as may be most comfortable for the operator, because angular irregularities due to the vibrations of the human hand may be averaged out while the stabilizer is casually tilted. Therefore, employing certain embodiments of the gimbal/handle combination, may reduce the degree of skill and level of concentration required in order to produce effectively stabilized results while walking, running, climbing stairs or merely standing still. Instead of 'trimming' the balance of the camera to the exact tilt angle required by any given shot, the operator may be able to merely hold his hand at the average angle desired, and just keep it generally upright to stay level in the roll axis!—an operation that is much more delicate and critical with prior-art gimbals.

Providing a bumper 612 within tube 608 rather than having it affixed to the handle (such as 306 as shown in FIG. 4) has at least two advantages. First, an outer tube (such as part 421 shown in FIG. 4) is no longer required to isolate the center post (such as 309) from contact with resilient pad 612 (412 in FIG. 4) during panning motions, because handle 606 is rotationally isolated from center post 609 by tube 608. Bumper 612 remains registered to the tilt and roll axes, because it is stationary with respect to tube 608. Therefore, bumper 612 can be contoured so that the size of the gap between tube 627*a* and bumper 612—the 'deadband' in effect—varies i.e. has a non-circular center cutout. The shape may be, for example, oval in shape, with a wider gap in the roll axis vs. the tilt axis, so that aberrations in handle position are less likely to influence roll. Other cross-sectional bumper configurations can also be used, depending, for example, on the application of the handle, or the distribution of weight about the center of gravity of the stabilizer and payload.

Certain illustrative embodiments of the gimbal/handle assembly have additional advantages over prior-art gimbal assemblies related to the technique required for initiating and stopping moves such as walking or running. Prior-art gimbals are positioned so that the camera/stabilizer structure hangs slightly bottom heavy from its gimbal's center. This makes keeping the apparatus level easier when stopped or moving at a consistent rate; but when the rate of motion changes, such as when starting or stopping a move, the stabilizer acts as a slight pendulum and will slowly tilt in response to the acceleration or deceleration. This must be compensated for by slight counter-pressure on the guide surfaces (such as 40, 46 shown in FIGS. 1 and 2). Gimbal/handle assemblies described herein may compensates for these accelerations more intuitively, since an initial acceleration induced by a firmly held handle 606 would intuitively or automatically produce the slight angular correction required as the handle is pushed ahead. Likewise, when stopping, the handle would intuitively be held back—both examples producing the slight counter-pressure against the resilient tilt/roll bumper that would keep the stabilizer upright or near upright throughout the move. In addition, gimbal/handle assemblies described herein may be caused (by manufacture or adjustment), to be in neutral balance in any or all three mutually perpendicular axes of gimbal rotation, so that no bottom-heaviness remains to cause pendular motion FIG. 8 is an isometric tilted view of the gimbal assembly of FIGS. 6 and 7 with a top cover removed to illustrate the control of the pan axis produced when handle 606 is rotated to cause resilient pads 611a,b to come into contact with paddles 626 a,b. Resilient pads 611a, b are fixed within flange 625. Paddles 626 a,b are attached to paddle ring 610, which is attached to inner race tube 608, and thus remain in rotational registration in the pan axis only with respect to center post 609 and its payload. As a result, a panning displacement of handle 606 affects the rotation of post 609 with substantially no effect to its tilt or roll orientation.

Figure 9:
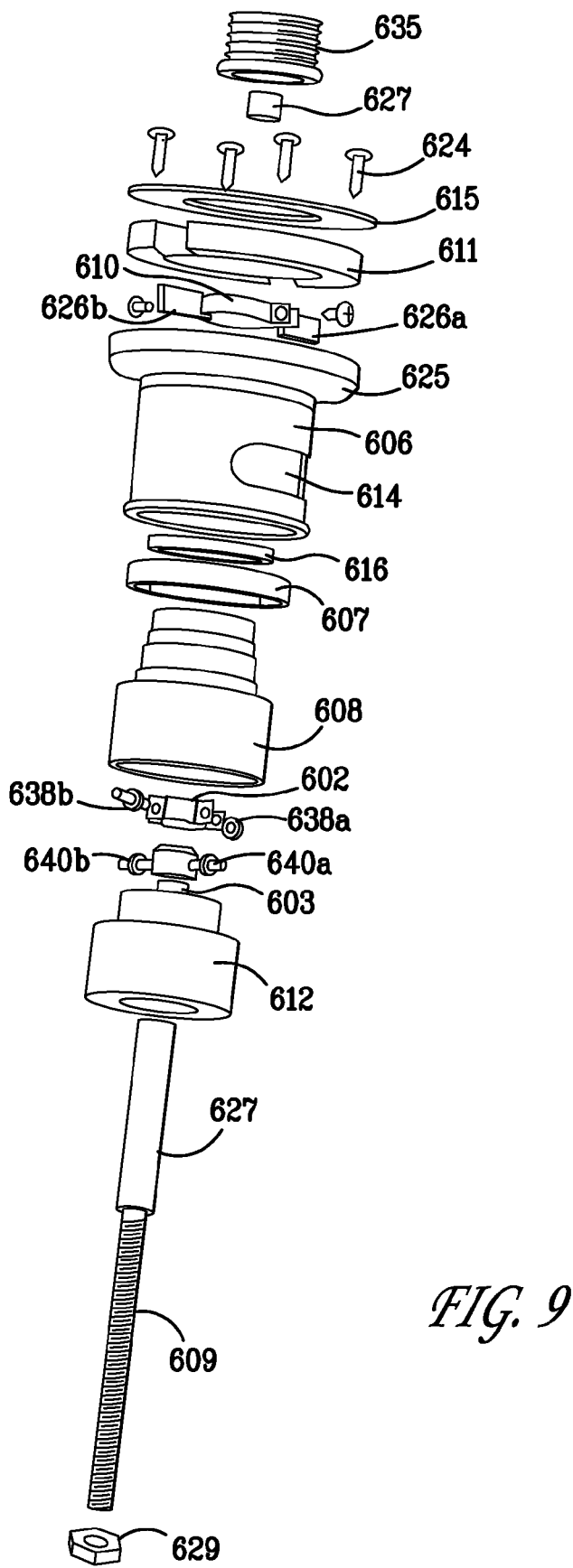
FIG. 9 is an exploded isometric view of the components of a handle and gimbal assembly according to an illustrative embodiment of the invention.
Figure 10:
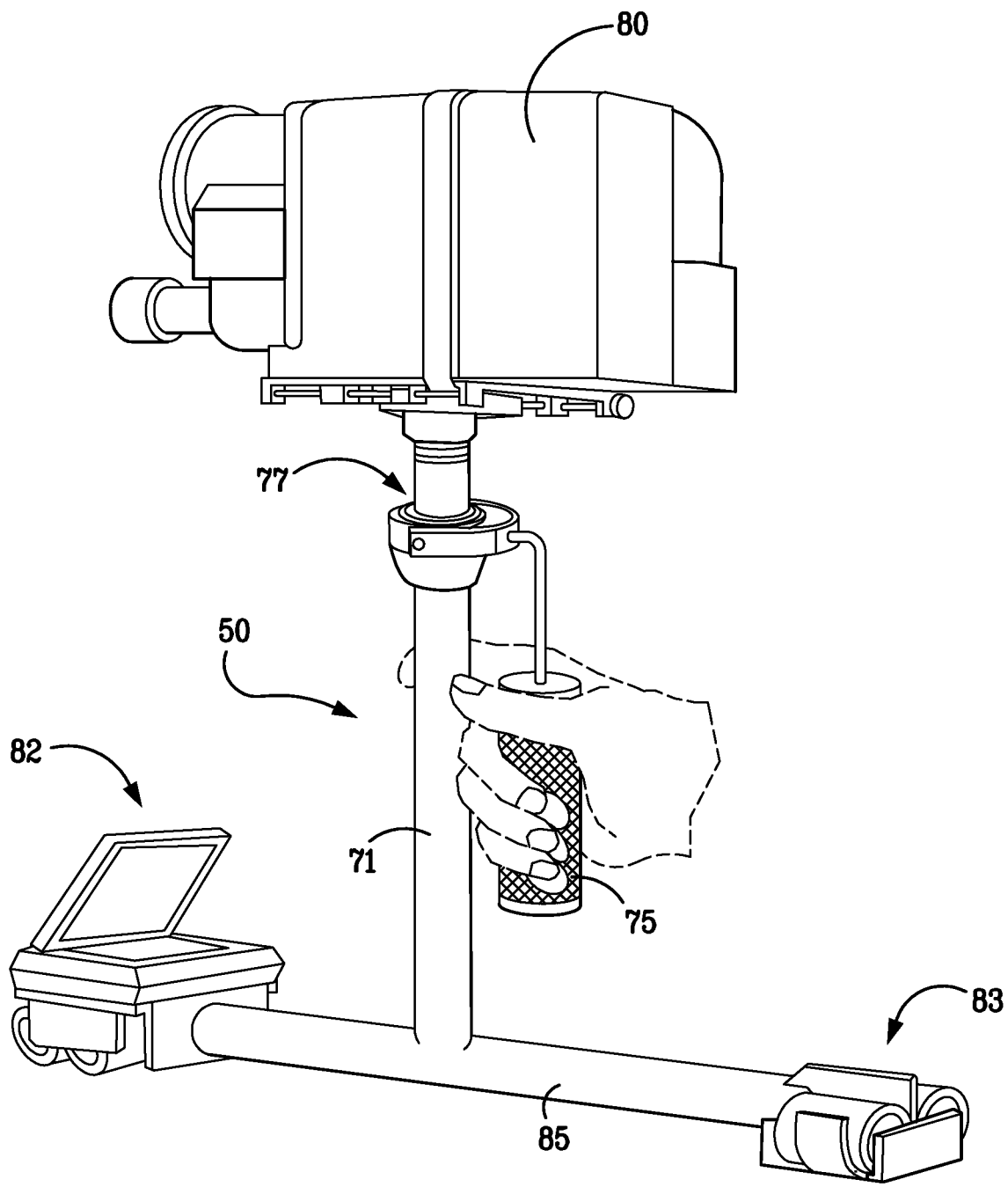
FIG. 10 is an isometric elevation of a prior art hand-supported camera stabilizer with its center post passing through its gimbal.

FIG. 9 is an exploded view of the components of a gimbal assembly according to an illustrative embodiment of the invention. Camera mounting interface 635 is shown at the top of the exploded apparatus. This interface can have a number of different configurations depending on the imaging device to be attached to it. Portions of spacer 627 are shown at the top and bottom of the apparatus. Spacer 627 surrounds center post 609 and is fixed with respect to it. Spacer 627 may be a single piece or be separate components disposed along center post 609. Top cover 615 is disposed over, resilient pads 611a, b, and can be made of any material that provides protection to the pads and can be incorporated into the design of the apparatus. Cover 615 will generally have a top surface shape similar to that of resilient pads 611, a,b (or of other configurations of pads that can be used in embodiments of the invention). Pan paddle ring 610 has paddles 626 a,b protruding radially therefrom. Each of resilient pads 611 a,b is disposed between paddles 626 a,b. Paddle ring 610 surrounds center post 609. Outer handle 606 is shown in FIG. 9 as a cylindrical handle with a flange 625 at the top. Flange 625 accommodates resilient pads 611 a,b, or possibly other control components. This shape has been found to be user-friendly and comfortable for the operator to grasp while providing the necessary support and other functional requirements of the apparatus. Some variations on the shape are within the scope of the invention. Handle 606 has slot 614, which, as described above allows a user to contact tube 608, or other component, depending on the specific configuration of the apparatus, to slow or stop motion about the pan axis. Pan bearing retaining ring 616 would generally be disposed within handle 606, together with pan bearing 607, which is mounted to tube 608 as shown in FIG. 6 Two-axis gimbal ring 602, post mounting sleeve 603, and tilt/roll resilient bumper ring 612, are all disposed within handle 606 in this illustrative embodiment. Further associated with the gimbal are gimbal ring bearings 638, a,b and outer race trunnions 640 a,b. A segment of spacer 627 is shown below resilient bumper ring 612, and would be disposed within bumper ring 612, when the apparatus is assembled. Center post 609 is shown with at least a portion threaded to engage locknut 629. Fastening and locating components in addition to the ones described herein can be implemented within the scope of the invention, provided they are compatible with the function of the apparatus. It is noted that as used herein "center post" can be comprised of various sections, that may be identified, for example as such components as a pan shaft, gimbal shaft, etc.

Figure 11:
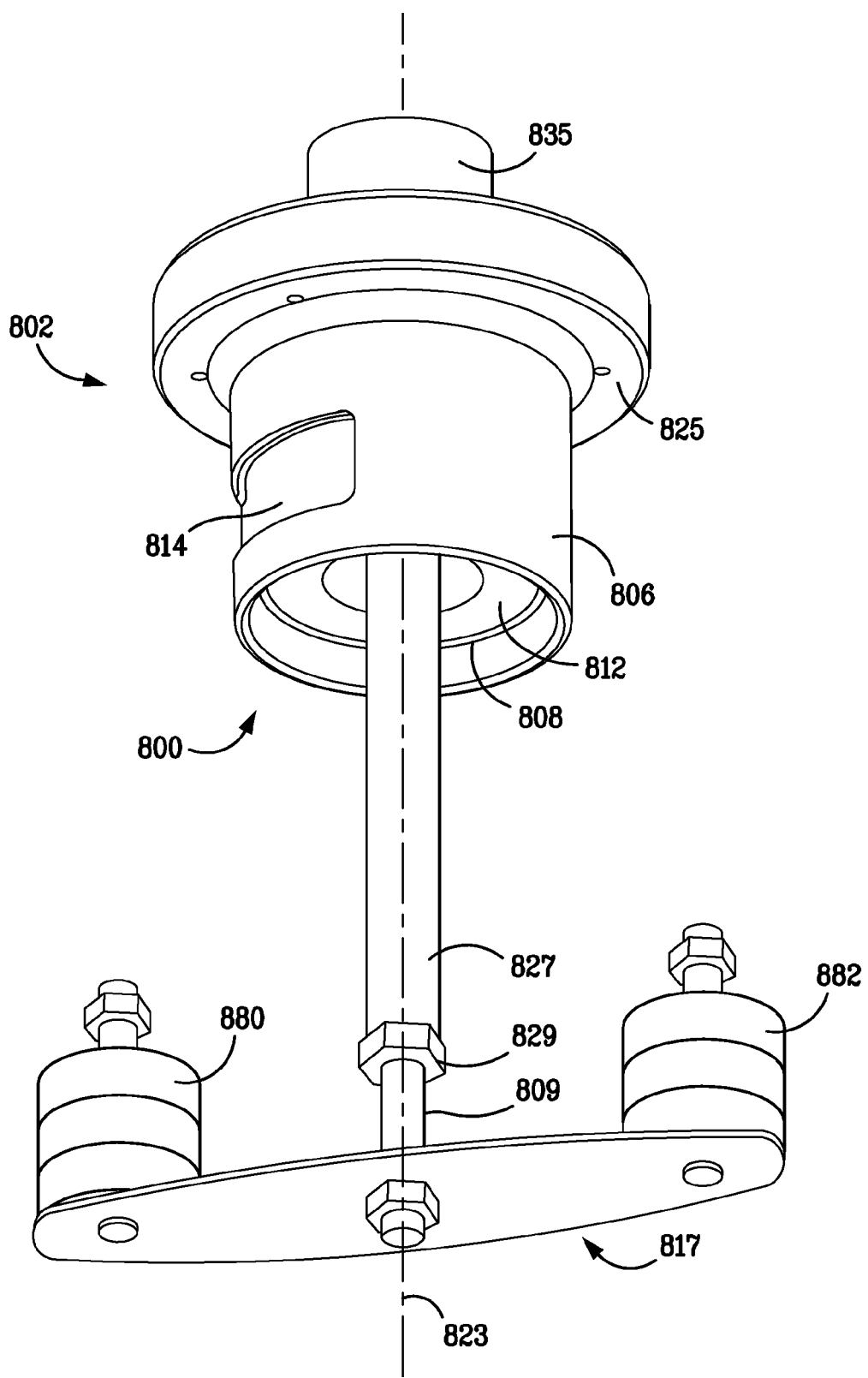
FIG. 11 is an isometric view of a handle and gimbal assembly having counterweight masses according to an illustrative embodiment of the invention.

FIG. 11 is an isometric view of a gimbal/handle apparatus 800 according to an illustrative embodiment of the invention. The upper combination gimbal/handle portion 802 can be, for example, of a configuration such is shown in FIG. 6. Spacer 827 is disposed around center post 809, and is held at the desired level by locknut 829, or other suitable means. A weight support structure 817 is attached to center post 809 and has mounted to it counterweights 880 and 882. These weights are provided to balance an imaging device that would be mounted at interface 835 so that the center of balance of the entire camera/stabilizer structure would preferably be located just below the pivot center of a two-axis gimbal assembly centered within handle flange 825 of handle 806.

Figure 1:
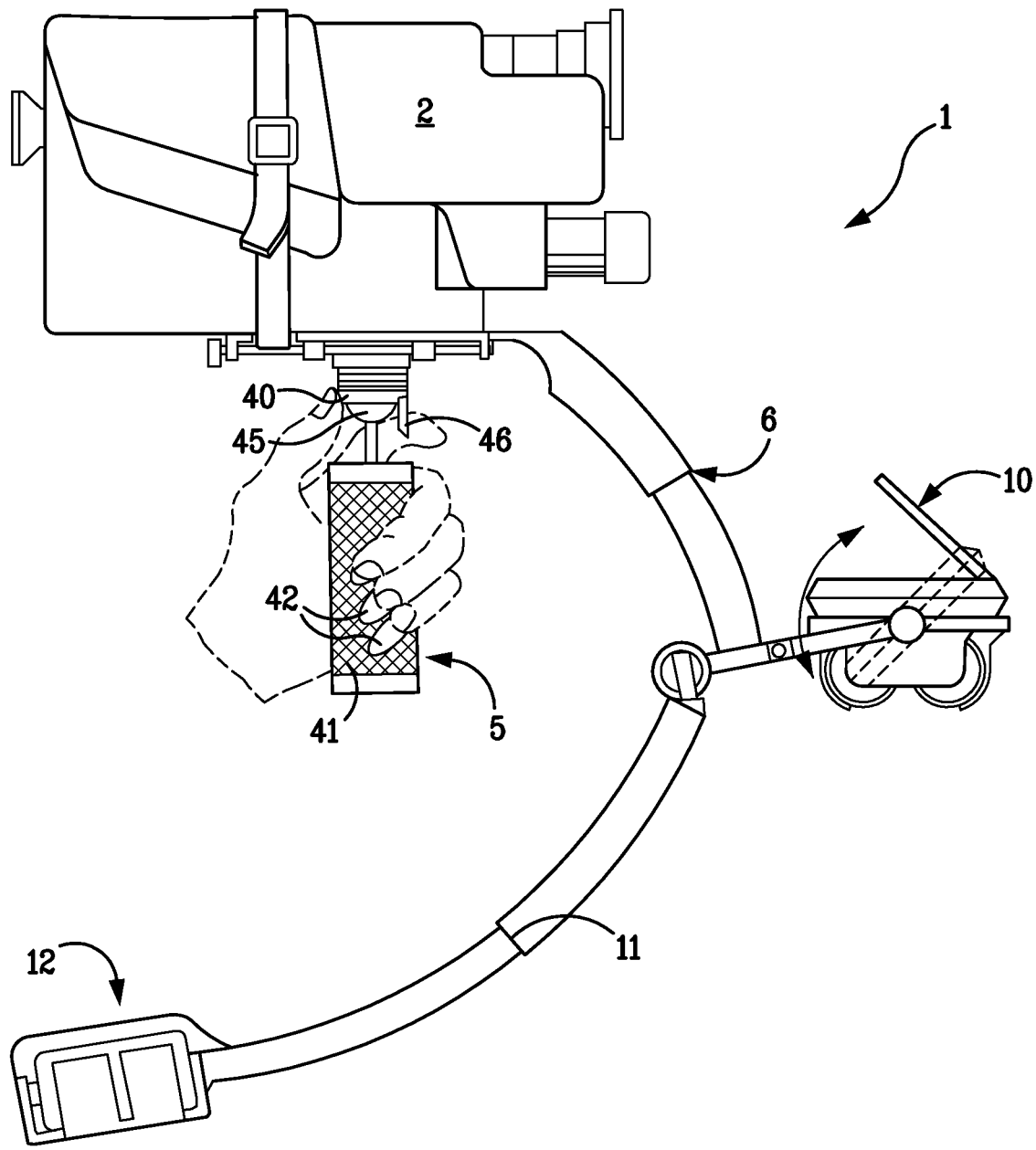
FIG. 1 is a side elevation of a prior art camcorder stabilizer.
Figure 2:
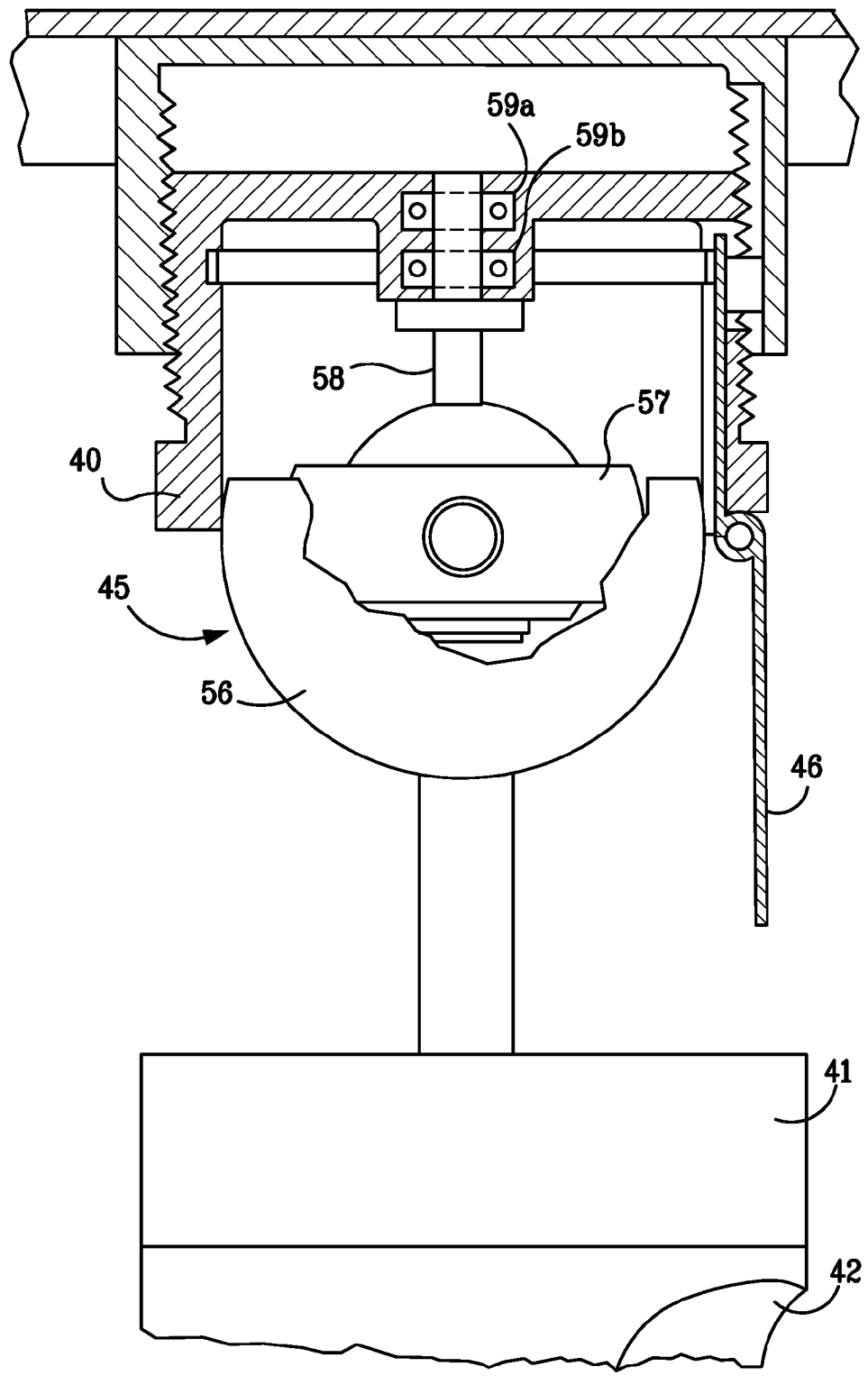
FIG. 2 is cutaway elevation of the prior art gimbal structure of FIG. 1.

Having counterweights 880,882 centered directly below the gimbal/handle portion of the apparatus can be advantageous compared to the counterweight supports such as shown in FIG. 1. The gimbal and handle' combination shown in FIG. 1 does not permit the center post construction of the embodiments shown in FIGS. 6 and 11, for example. When the center post runs through the gimbal assembly, adjustment of bottom heaviness can be accomplished by raising or lowering counterweight support structure 817. When counterweight support structure and its associated weights are symmetrically disposed around the center post longitudinal centerline balancing axis 823, the bottom heaviness adjustment is made directly along centerline balancing axis 823, and therefore, the center of balance of an imaging device attached to interface 835 can likewise remain centered along balancing axis 823. Slot 814 provides access to the outer surface of tube 808, which surrounds resilient bumper 812. This provides the user with a means to stop or slow the relative rotation of tube 808 with respect to handle 806. As previously noted, the term "tube" does not necessarily indicate a circular cross-sectional shape, nor a uniform cross-section throughout, but rather can have various shapes to accommodate the interior components of the gimbal/handle assembly. The "tube" can also have an extension that does not extend around to form a full hollow section.

Figure 12:
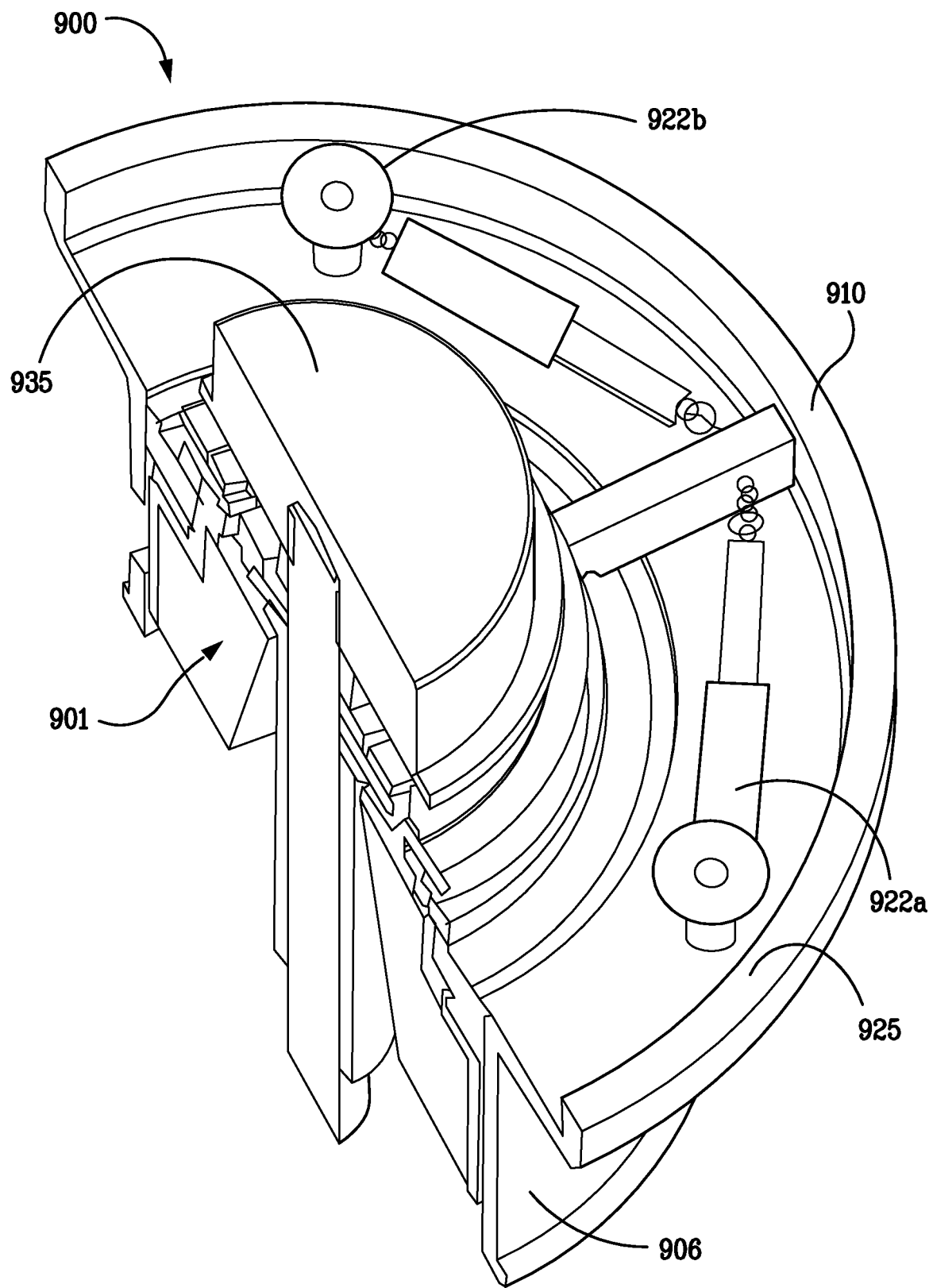
FIG. 12 is an isometric view of a handle and gimbal assembly with dashpot-type shock absorbers according to an illustrative embodiment of the invention.

FIG. 12 is an isometric view of a gimbal/handle assembly 900 showing the use of dashpot-type shock absorbers 922 a,b as resilient control means instead of resilient pads. Note that combinations of various control components can be used. Dashpots 922 a,b are attached to or have springs that are attached at one end to paddle 910 and at the other end to handle flange 925. Panning displacement of handle 906 thus biases paddle 910 to rotate camera interface 935 via two-axis gimbal assembly 901. As stated above, any resilient, shock-absorbing, biasing, dampening means that are appropriate to the weight and inertial moment of an associated, balanced structure, such as a camera stabilizer, and that can be incorporated into the gimbal/handle design are contemplated within the scope of the invention.

Figure 13:
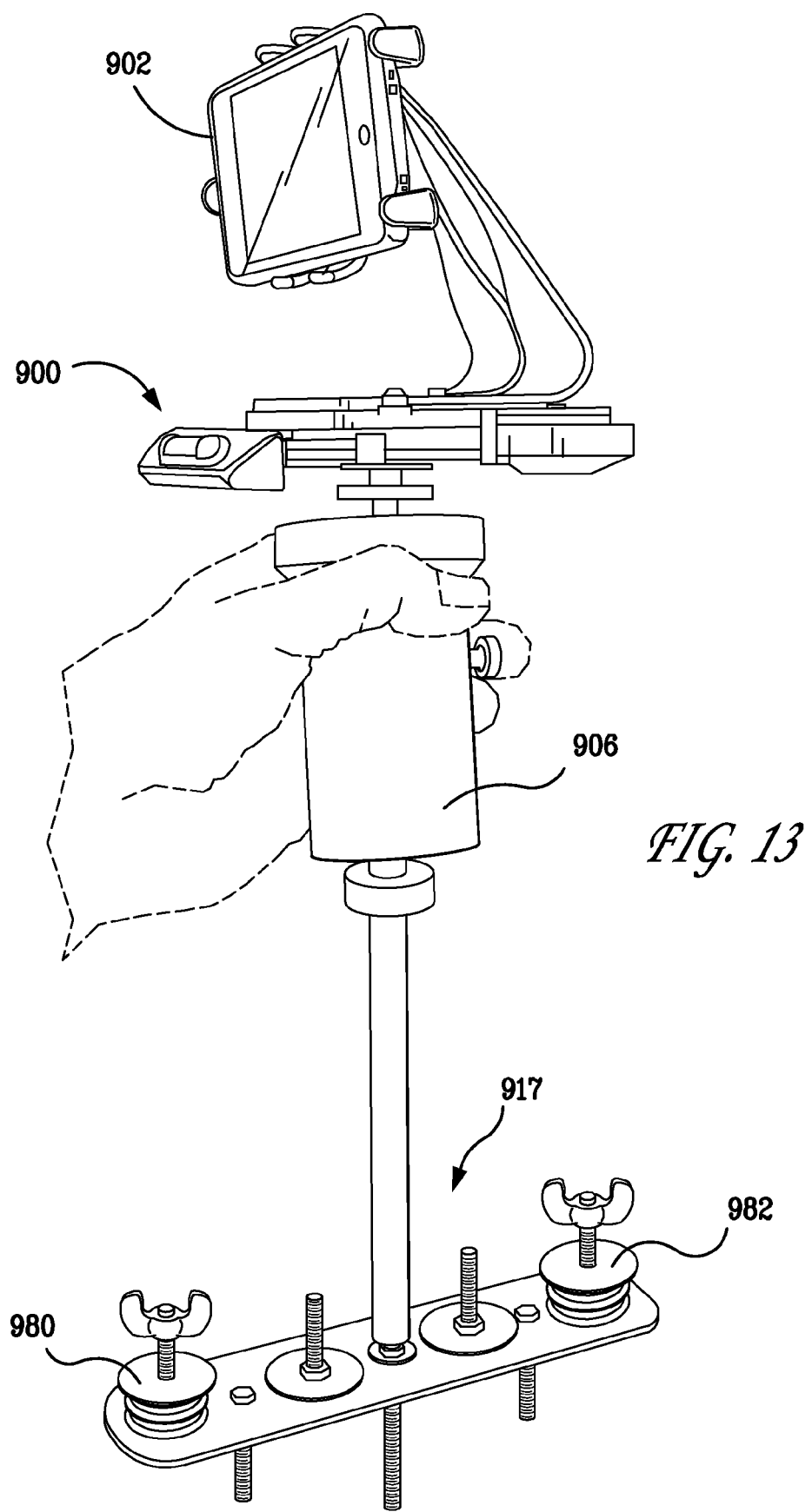
FIG. 13 depicts a stabilizing support system according to an illustrative embodiment of the invention.

FIG. 13 depicts a balancing support structure 900 with a device 902 attached thereto, according to an illustrative embodiment of the invention. A handle 906 is disposed around a gimbal assembly (not visible). A center post is connected to the gimbal structure, such as by configurations describe above. A counterweight support structure 917 with associate counterweights, 980, 982 are positioned at a center post end opposite the device 902.

Figure 14:
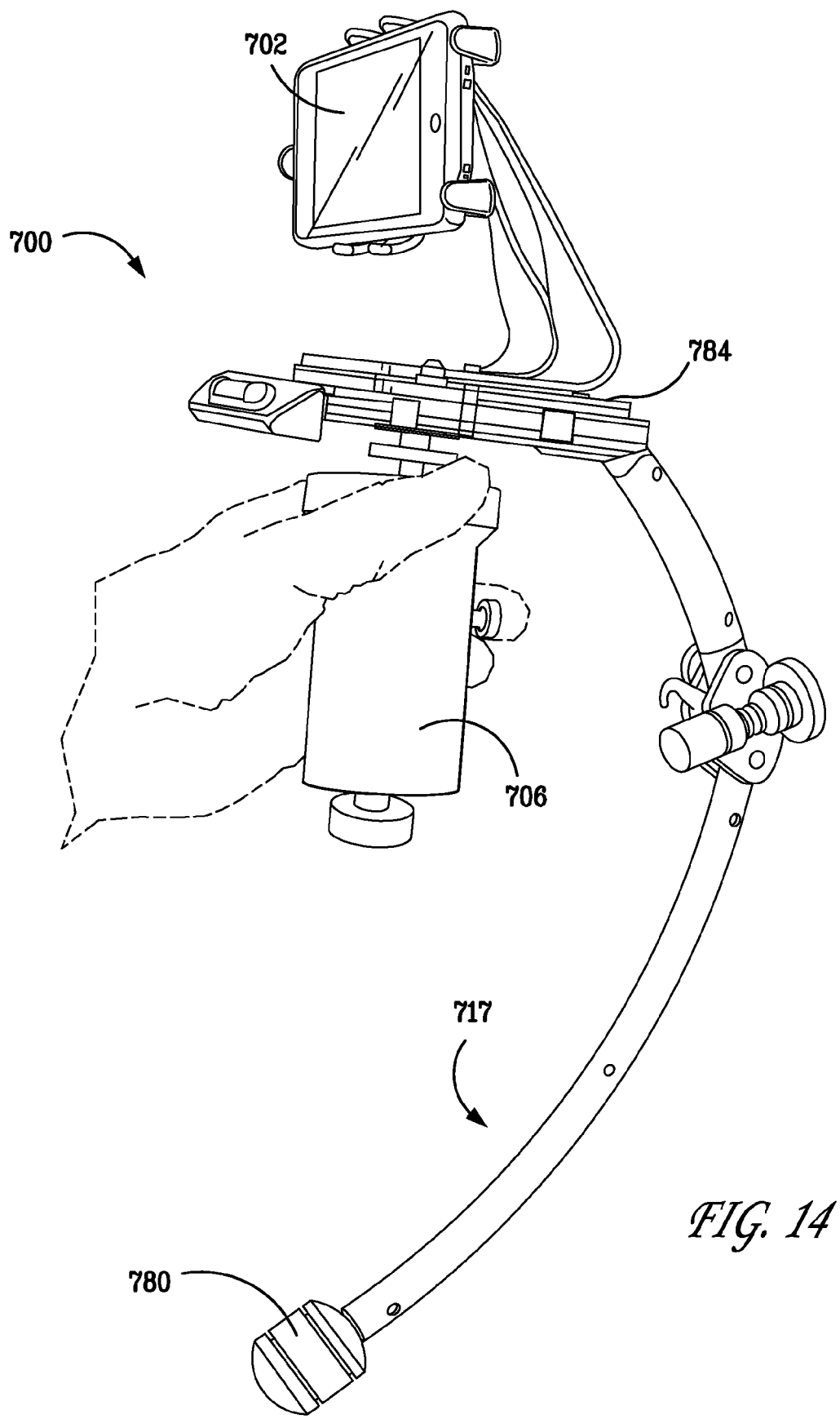
FIG. 14 depicts a stabilizing support system according to an illustrative embodiment of the invention.

FIG. 14 depicts a further embodiment of a balancing support structure 700 with a device 702, according to an illustrative embodiment of the invention. This embodiment has a counterweight support structure 717 that is foldable. It extends from a, preferably adjustable platform 784 and curves below handle 706. Weights 780 can be incorporated to balance the support structure with the device attached thereto so the center of gravity is at the approximate center of a gimbal assembly disposed within handle 706.

Figure 15A:
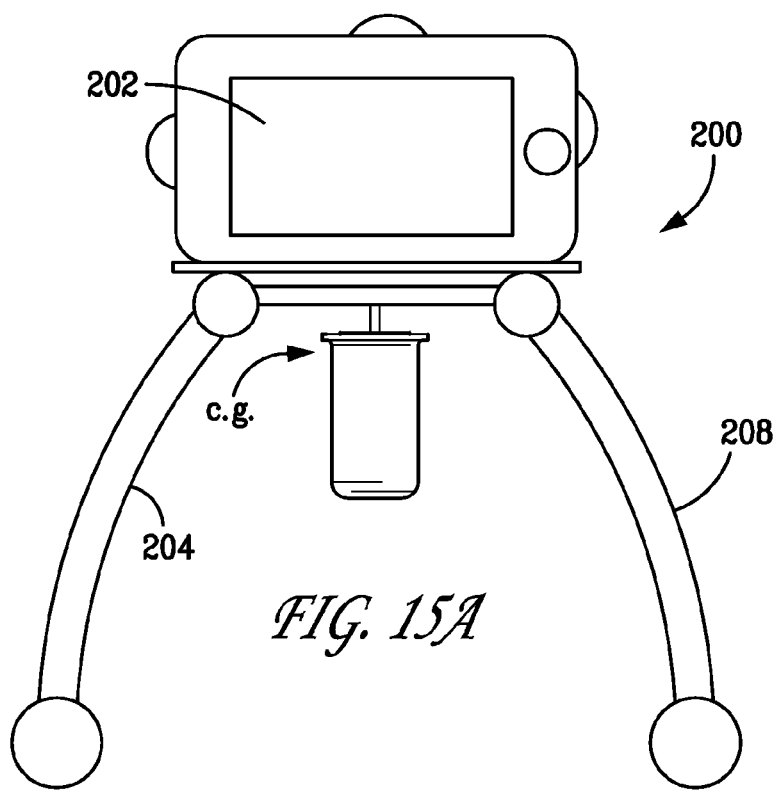
FIGS. 15A-B depict a foldable balancing support structure according to an illustrative embodiment of the invention.
Figure 15B:
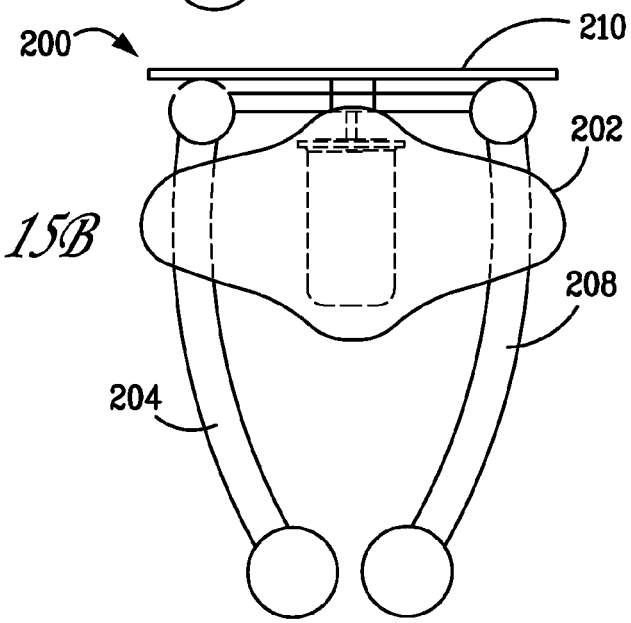

Various embodiments, or portions thereof, of the gimbal/handle assembly described herein can be used with a foldable equipment/device stabilizing/balancing support system. FIGS. 15A-B depict a foldable balancing support structure 200 with a device 202 attached thereto in an unfolded and folded configuration, respectively. A handle 206 is disposed around a gimbal assembly (see for example FIG. 16). Balancing arms or spars 204, 208 extend from a stage 210 and fold toward one another, preferably originating and remaining in substantially the same plane as one another. The pivot ranges of spars 204, 208 are preferably symmetrical to one another. Additionally, the balancing support structure 200 as a whole is substantially symmetrical. The balance arms may each also be comprised of two or more segments, wherein the segments are pivotable, telescoping and/or foldable with respect to one another. The balancing spars may be weighted at the end opposite from the stage.

As shown in FIG. 15B, stage 210 can also fold toward the plane of the spars. In this folded configuration, the support, with the device attached can be stored, for example in a holster, and which can be attachable to a belt or other object. The holster may cover the gimbal handle when the apparatus is folded.

The balancing support system can be designed for a specific device, such as an iPhone, or other imaging device model, so that little or no adjustment is necessary to balance the structure when unfolded. The device and balancing structure can be a fully integrated, inclusive and pre-balanced apparatus that includes a stabilizer, image-capture device and one or more related electronic and/or mechanical components such as playback equipment, monitors, batteries, stands, connectors, lights, microwave transmitters, etc.

The center of gravity of the apparatus with the device positioned on it, is preferably in the vicinity of the gimbal handle, and most preferably toward the top of the gimbal apparatus. The arms, for example, can telescope or fold or swing up and down to accommodate the weight and center of gravity to accommodate the difference between an image-capture device with and without a case.

Figure 16:
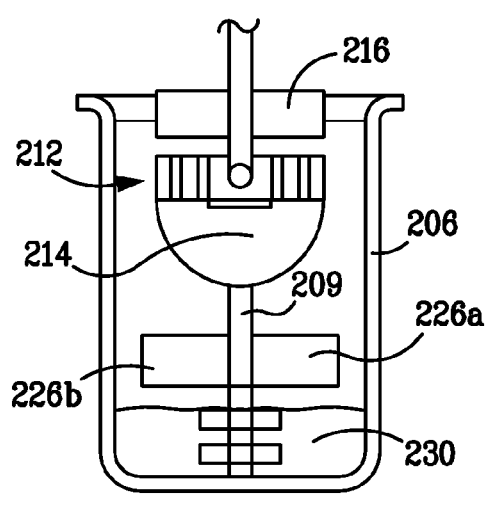
FIG. 16 depicts a handle and gimbal assembly according to an illustrative embodiment of the invention.

FIG. 16 depicts a gimbal/handle assembly according to an illustrative embodiment of the invention, which can be used with a foldable support structure, or other balancing support structure. The handle includes a three-axis gimbal assembly 212. The illustrative example includes a gimbal assembly having a cup 214 as the outer gimbal component. A pad 216 comprising a resilient material is disposed above gimbal assembly 212 so that the degree or acceleration of tilt or roll motion is affected when there is contact between pad 216 and the gimbal assembly or other components during rotation of the apparatus. A center post 209 extends from or through the center of gimbal assembly 212. Pan bearings 230 allow rotation in the pan axis. One or more paddles 226a,b extend radially from center post 209. Additional resilient component(s) are incorporated and positioned so the paddles 226a,b will engage (i.e. contact and compress if sufficient force is exerted) them to control motion about the center post longitudinal axis, such as when handle 206 is rotated.

Figure 17A:
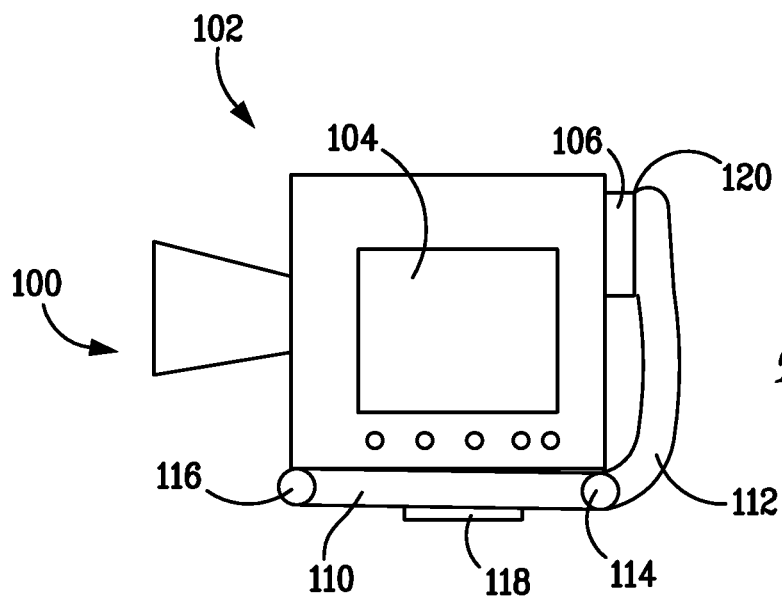
FIGS. 17A-B depict a foldable balancing support structure according to an illustrative embodiment of the invention.
Figure 17B:
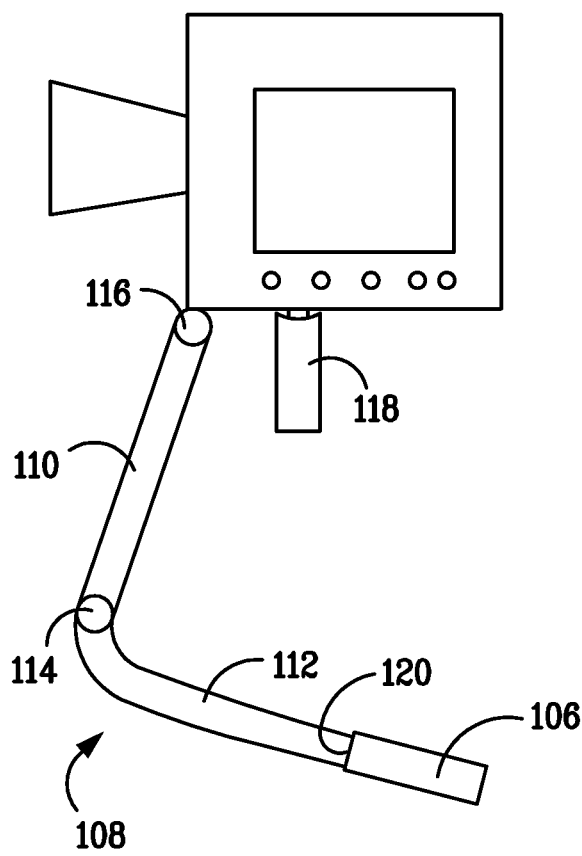

FIGS. 17A-B depict an integrated stabilizer/device apparatus 100, wherein the device 102 is a camera. Included in this embodiment is a monitor 104 and battery 106. Additional auxiliary components can also be included, and the apparatus configured so it is properly balanced with respect to all included components.

Apparatus 100 has a balance arm 108, which can be folded toward device 102, as shown in FIG. 17A-B shows balance arm 108 in an unfolded position. The apparatus is designed so that when balance arm 108 is unfolded, the apparatus is automatically balanced, so that the user's motion will be isolated from motion of the camera. In this embodiment, balance arm 108 has an upper segment 110 and a lower segment 112, which are pivotable with respect to one another at pivot 114. Upper strut 110 is also pivotable at pivot 116 with respect to device 102. The battery component can also be pivotable at pivot 120.

In the illustrative embodiment shown in FIGS. 17A-B, gimbal/handle apparatus 118 is disposed beneath device 102 is foldable underneath it.

Weighted components can be provided at pivot 114, and battery 106 also serves as a weight. The design of each integrated apparatus can have some common components for different device models, such as the gimbal apparatus or balancing arm. To customize the apparatus for a particular device model, certain areas will be weighted to achieve the proper balance. This is preferably done at the fabrication site so the unit as sold is pre-balanced.

Figure 18A:
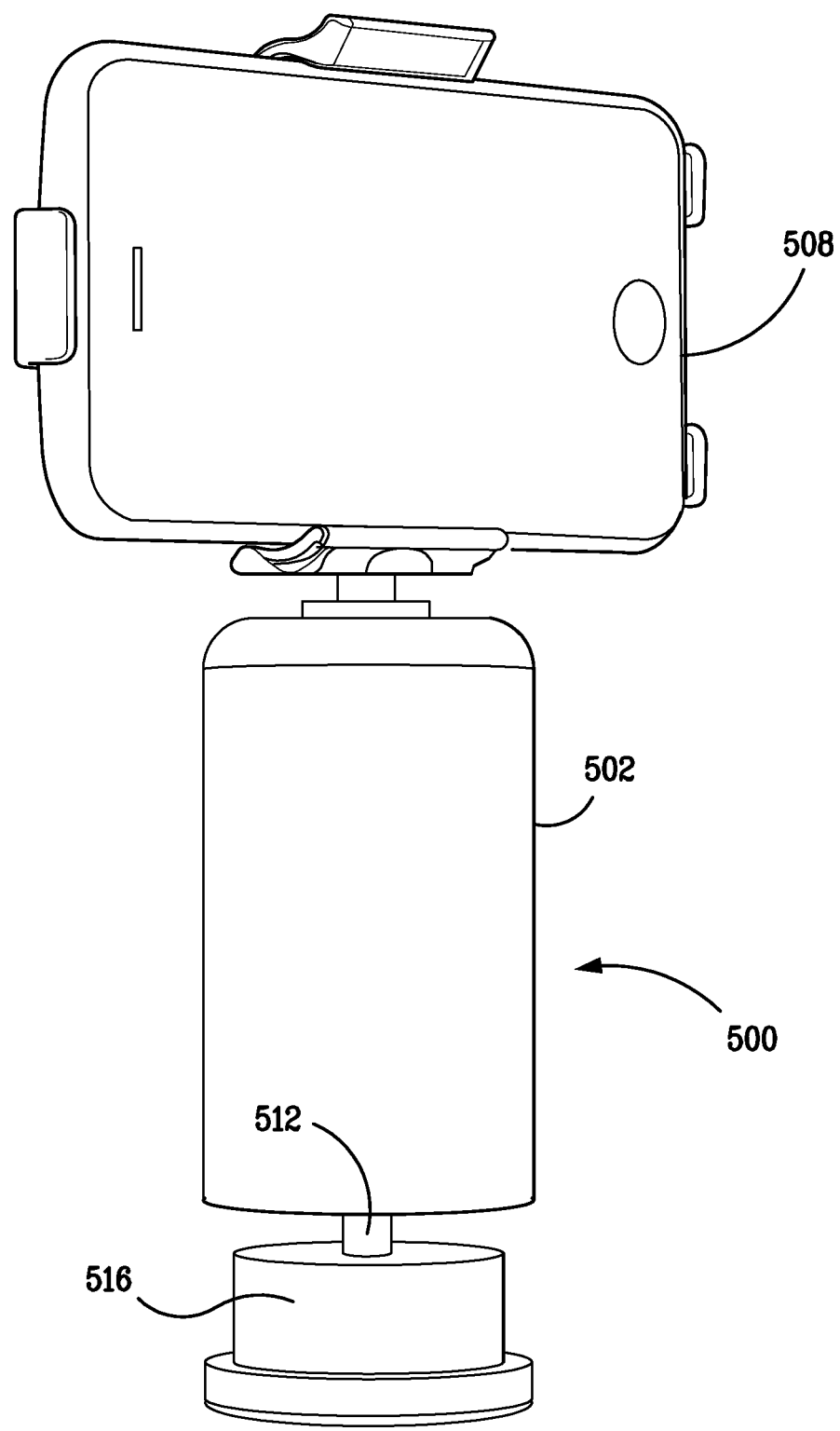
FIGS. 18A-B depict a gimbal and handle assembly according to a further illustrative embodiment of the invention.
Figure 18B:
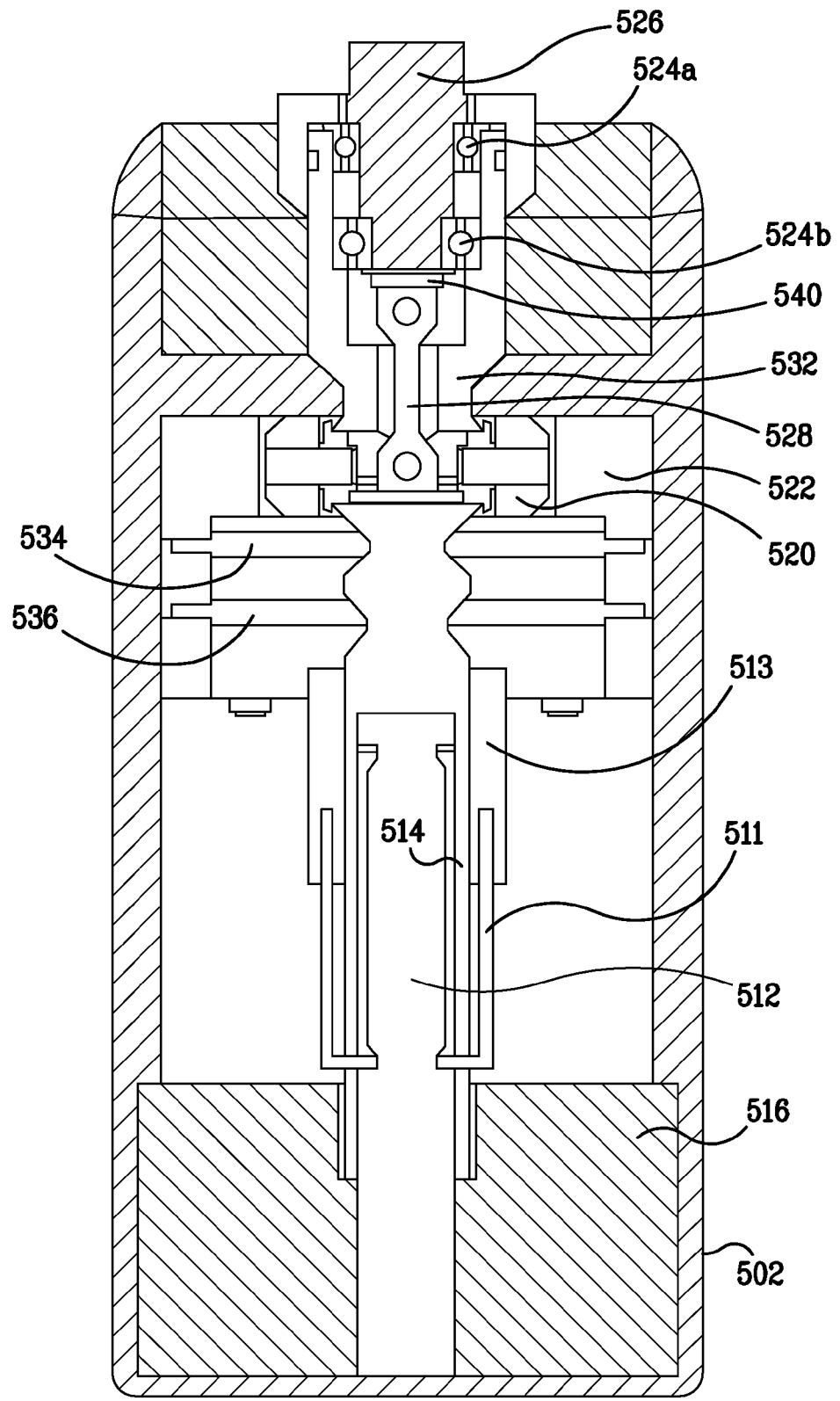

FIGS. 18A-C depict a gimbal and handle assembly 500 according to an illustrative embodiment of the invention. Assembly 500 has a handle 502 disposed around a gimbal assembly 506. A device 508, such as a lightweight imaging device, is situated on, and stabilized by, the handle and gimbal assembly 500.

The embodiment shown has two modes of operation. FIG. 18A depicts an extended mode for stabilizing control of small cameras, such as those marketed as 'iPhone' and 'flip.' A telescopic assembly 510, includes a shaft 512, and a cylinder 514 into which shaft 512 can be drawn. Shaft 512 has a counterweight 516 attached at a distal end, which is shown extended in an operational mode in FIG. 18A. FIG. 18B is a cross-sectional drawing of the gimbal and handle assembly 500 wherein the telescopic shaft 512 is contracted for storage and transport. In this mode, counterweight 516 is drawn into handle 502. One or more springs 511 are mounted in spring mount housing 513 to facilitate maintaining the assembly in the operational mode wherein the telescopic shaft 512 is in an extended position.

Gimbal assembly 506 includes an inner ring 520 and an outer ring 522 for two-axis rotation. Pan bearing assemblies 524a,b provide another axis of rotation for the gimbal and handle assembly. They are positioned by a pan shaft retaining clip 540. Pan bearings 524 a,b allow device 510 to rotate with respect to handle 502 about an axis that is in line with the longitudinal center line of handle 502. In the illustrative embodiment shown, two pan bearing assemblies are shown, but depending on the application two are not mandatory. An inner pan bearing component of each pan bearing assembly is attached to a pan bearing shaft 526. Pan bearings 524a,b are located high enough to have room below the pan bearings for a resilient material component, for example about a ½" length of twisting Sorbothane®. Sorbothane®, a visco-elastic polymer, and more particularly a thermoset, polyether-based, polyurethane material, is a good choice of material for many applications of various embodiments of the invention because of its shock absorption properties, good memory, and vibration isolation and damping characteristics. Other materials exhibiting some or all of these characteristics may also be suitable. One or more columns of twisted resilient material can be incorporated into the assembly to control rotational motion.

For the lightweight device applications in particular, pan bearings 524 *a,b* are preferably very small so they have little friction, as there is no or little augmented pan inertia. This design is dependent upon as little inertia as possible, so as to eliminate the camera continuing to pan through neutral and bouncing back.

Figure 19A:
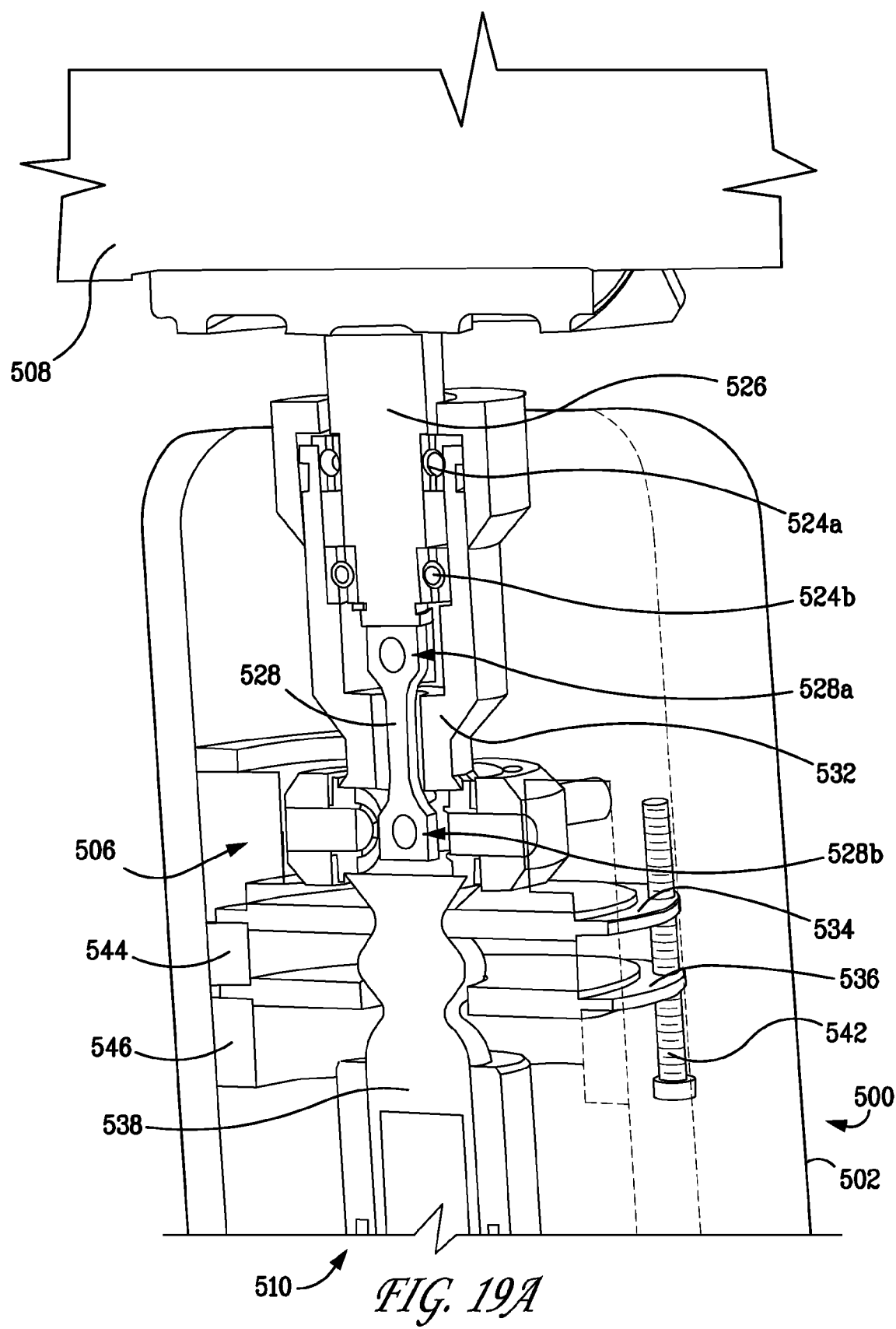
FIGS. 19A-B depict a cross-sectional view of the gimbal and handle assembly of FIGS. 18A-B according to a further illustrative embodiment of the invention.
Figure 19B:
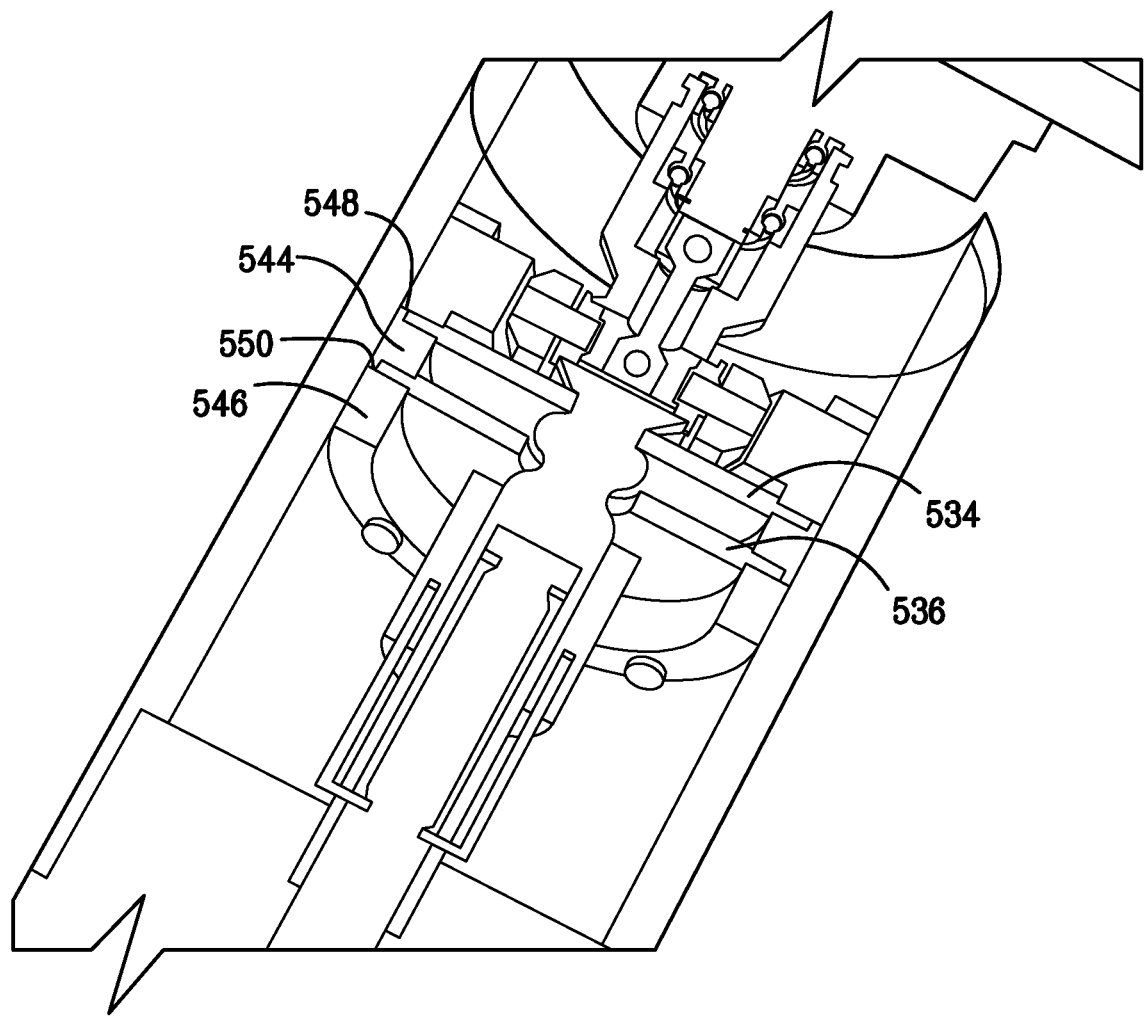
Figure 20:
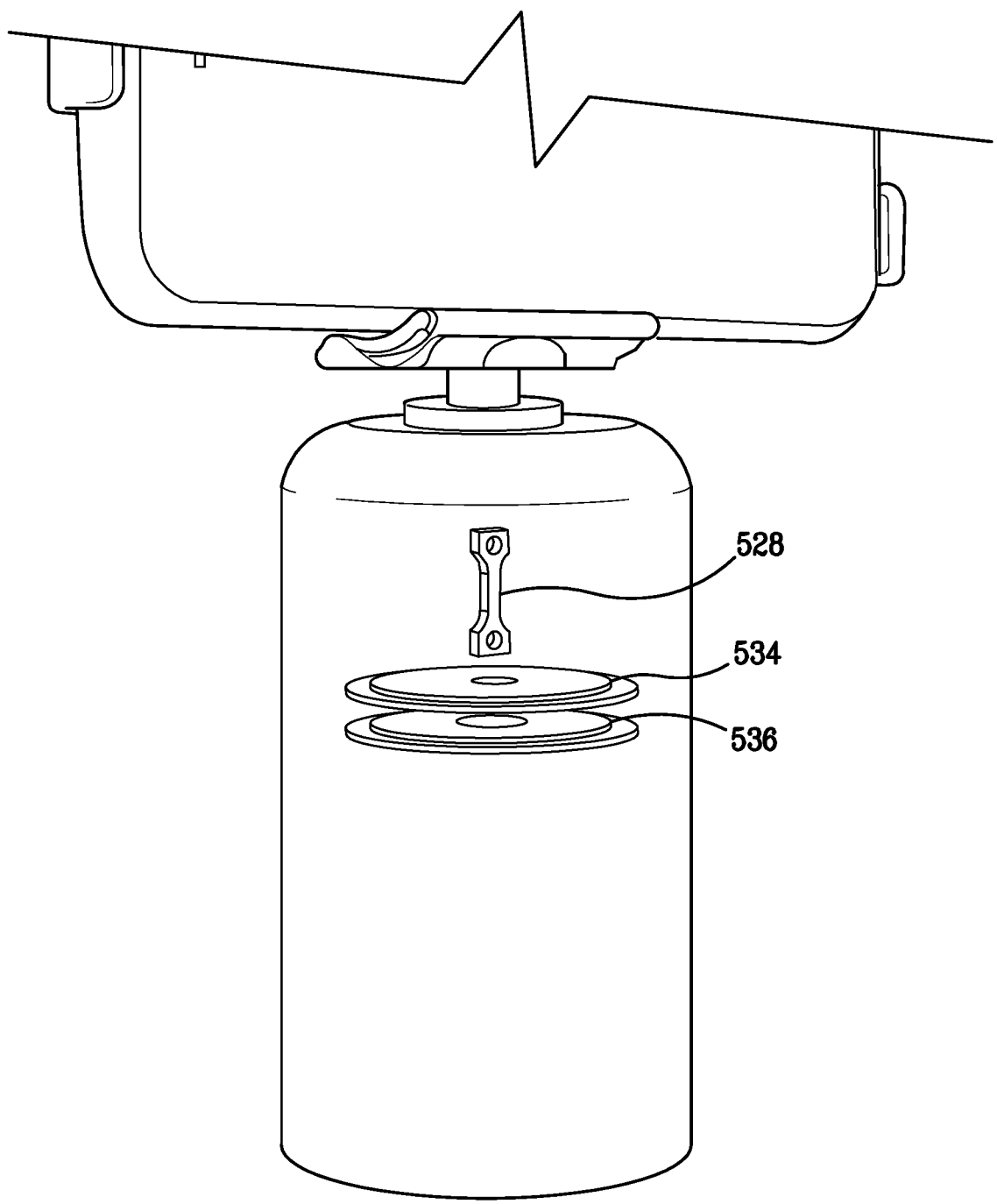
FIG. 20 depicts resilient components of the gimbal and handle assembly of FIG. 19.

FIG. 19A is a cross-sectional of handle 502 showing the handle transparently, according to an illustrative embodiment of the invention. FIG. 19B is a close up of resilient rings 534, 536 and the associate compression rings 544, 546. FIG. 20 depicts only the resilient members used for dampening and biasing, with the handle shown transparently. Rotational control mechanisms are provided for pan, tilt and roll motions, although not all mechanisms need to be implemented. Pan motion control is accomplished by a strip of resilient material 528 having a first end 528*a* attached to pan shaft 526 and a second end 528*b* attached to main gimbal shaft 532. When there is relative rotation of the shafts with respect to one another, strip 528 twists, thereby dampening the relative rotation of the shafts and biasing them back to a particular position or range of positions. Pan resilient component 528 can be formed of various resilient materials. Sorbothane® is particularly suitable as a resilient material in this application. The term "strip" used to describe the resilient material is not limited to a flat strip, but can have various cross-sectional profiles.

Two resilient rings 534, 536 provide control of tilt and roll motions. Resilient ring 534 stabilizes gimbal shaft 532 in relation to handle 502 and is preferably in substantially constant contact with the shaft segment 538, as the rig is neutrally balanced, as opposed to slightly bottom heavy. The reason the rig is neutrally balanced is to enable the operator to tilt or roll the camera and hold it continuously with the same stabilizing benefits as if it were level. Resilient rings 534, 536 are compressed at their edges by compression rings 544, 546, which are secured to the inside of handle 502. One or more screws 542 draw compression rings 544, 546 toward one another, thereby compressing the edges of resilient rings 534, 536 and securing them to the apparatus. In an exemplary embodiment of the invention, four screws uniformly distributed around the compression rings, result in a substantially uniform thickness of the edges of resilient rings 534, 536. In an illustrative embodiment of the invention, the resilient ring edges are compressed by 50%. An exemplary resilient ring thickness is 1/16 inch in a non-compressed state, and 1/32 inch in a compressed state. Raised outer edges, such as 548, 550 on compression ring 544, can be provided to protect against overcompressing. The resilient rings may be further secured to the apparatus using adhesives.

Resilient ring 536 has a slightly larger center hole, which means that it is not in contact with shaft segment 538 until a tilt and/or roll maneuver is made, especially aggressive maneuvers.

Although resilient components 534, 538 are described as "rings" and are shown as relatively flat, they may have non-circular shapes, for example if it is desirable to vary the level of dampening when the device is rotated in different directions or to provide a more uniform level of dampening in all directions, given the devices will generally not be symmetrical in an X-Y plane perpendicular to the devices longitudinal center axis. BY way of example, a camera is generally significantly thinner than it is wide. Thicker resilient components than shown and resilient components varying in thickness throughout may also be used to achieve the desired distribution of dampening or other control.

A fully integrated system may provide more options as to weight distribution. For example, weighted components can be incorporated to increase the weight closer to the image-capture device component. Various auxiliary components can also advantageously provide different weight distribution options. Additional options for achieving the weight distribution with respect to a pivot point of a gimbal apparatus are available when the system is fully integrated. Although being fully integrated is desirable, devices can still be constructed with the ability to add components, and thus would also include the ability to add weighted components to balance the apparatus. Auxiliary functional components can also be provided together with specific complimentary balancing components, and the original structure can be designed to readily accommodate them. For example, an integrated stabilizer/device apparatus may have a pre-configured connection point to accommodate a lighting device. The integrated apparatus could also have a pre-configured connection point to accommodate an additional weighted component to balance the lighting device. The lighting device and the balancing component can be sold separately or individually. This allows for a user to add auxiliary components while maintaining the balance of the stabilizer.

The integrated system may be configured to be foldable to provide a more compact system when not in use, or to allow the image-capture device to be more easily used without use of the stabilizer function.

Now that various illustrative embodiments of the invention have been described, some of the important general concepts will be set forth.

A stabilizing controller to balance, support and orient a device is presented that includes a combination gimbal/handle assembly. The gimbal assembly is positioned at substantially the center of balance as defined with respect to the stabilizing controller with the device attached. A handle is disposed around the gimbal assembly. A center post passes through the centerline balancing axis of the gimbal apparatus and thus, longitudinally through the handle. The center post may have a longitudinal balancing axis Z, for example as shown in FIG. 11, designated as 823. We define an X-axis and a Y-axis as being mutually perpendicular to the Z-axis. The gimbal/handle assembly with center post provides motion about each of the X-axis, Y-axis, and Z-axis isolated from the motion of the other axes. The gimbal/handle assembly includes a mechanism to control rotational motion about the Z axis of the center post. The balancing support structure can also include one or more resilient components to control motion of the center post when an outer gimbal ring is tilted from a plane perpendicular to the center post. In a simple embodiment of the invention only motion about the Z axis is isolated from the other axes of motion.

The gimbal assembly, may have a post mounting sleeve, an inner gimbal ring, and an outer gimbal ring (see for example FIG. 3, parts 302, 303, 304, respectively) wherein the post mounting sleeve is disposed around the center post and within the inner gimbal ring and is rotationally connected to the inner gimbal ring, the inner gimbal ring is disposed within and rotationally connected to the outer gimbal ring, and wherein the handle is disposed around and is rotational connected to the gimbal assembly.

A pan bearing assembly having an inner race component and an outer race component may be used to rotationally connect the camera assembly and the handle. The pan bearing assembly may be disposed around the outer gimbal ring and within the handle. The pan bearing assembly inner race component may be attached to the outer gimbal ring, and the pan bearing assembly outer race component is attached to the handle.

The outer gimbal ring may extend at least partially downward through the handle to make it accessibly to an operator so its relative motion with respect to the handle can be stopped or impeded. The device may be for example, an opening in the handle through which the operator can access the outer gimbal ring with the operator's finger(s). A push button device secured to the handle and engagable with the inner gimbal ring can also be implemented for this purpose.

The assembly to control rotational motion about the Z axis of the center post will generally contain resilient components such as springs or foam or resilient polymer such as Sorbathane®. For example, one or more springs can be connected at a first end to the handle and a second end to the outer gimbal ring. Another mechanism may comprise a pad ring containing pads and paddles wherein the pad ring is non-rotationally attached to the outer gimbal ring. One or more paddles are attached to the pad ring and extend radially outward from the pad ring. One or more pads, formed of a resilient material, are attached to the handle and disposed between the paddles. Between the paddles and the pads are gaps so that when the handle is rotated with respect to the outer gimbal ring, the pads contact the paddles, thereby controlling the rotational motion about the Z-axis.

To control the motion of the center post when the outer gimbal ring is tilted from a plane perpendicular to the center post resilient component(s) comprised of a compressible material can be employed. The resilient component(s) can be disposed within the portion of the outer gimbal ring extending downward and can be positioned to engage with the center post when the outer gimbal ring is tilted from a plane perpendicular to the center post. This slows or stops the relative motion of the center post with respect to the handle, without it being an abrupt transition.

The balancing support structure may also include counterweight(s) disposed about the center post to position the center of balance of the support structure with the device in place below the pivot center of the gimbal assembly. The counterweights are disposed substantially symmetrical about the center post and are preferably adjustable. The counterweight system can be non-adjustable, such as one designed for a specific support system and device.

It is noted that, although illustrative embodiments of the invention have been described with respect to cameras, the gimbal/handle assembly and a stabilizer having the gimbal/handle assembly can be used for other devices that may require the type of support and stabilizing that is possible with the invention described herein.

The invention includes gimbaled handles, equipment supports having gimbal/handle assemblies, equipment supports with gimbal/handle assemblies including the equipment, and methods of using and making any of the embodiments described herein and their equivalents.

Various embodiments of the invention having different combinations of elements. The invention is not limited to the specific embodiments disclosed, and may include different combinations of the elements disclosed and their equivalents.

It will be understood that various changes in the details, materials and arrangement of parts which have been herein described and illustrated in order to explain the nature of this invention may be made by those skilled in the art within the principle and scope of the invention as expressed in the following claims.

The invention claimed is:

1. A stabilizing controller to balance, support and orient a device, the stabilizing controller comprising:
   a gimbal assembly positioned at the center of balance of the stabilizing controller with the device attached, the gimbal assembly having an outer gimbal ring;
   a handle disposed around the gimbal assembly;
   a center post coincident with the centerline balancing axis of the gimbal apparatus and having a longitudinal balancing axis Z, the center post attached such that motion about each of an X-axis, Y-axis, and the Z-axis, the three of which are mutually perpendicular to one another, is isolated from the motion of the other axes;
   one or more assemblies to control rotational motion about at least one of the X-axis, Y-axis, and Z-axis; and
   one or more resilient components to control motion of the center post when the outer gimbal ring is tilted from a plane perpendicular to the center post.

2. The stabilizing controller of claim 1 wherein only motion about the Z axis is isolated from the other axes of motion.

3. The stabilizing controller of claim of claim 1 wherein:
   the outer gimbal ring extends at least partially downward through the handle;
   the handle has a device by which an operator can impede or stop the relative rotation of the handle with respect to the outer gimbal ring; and
   wherein the device is an opening in the handle through which the operator can access the outer gimbal ring with the operator's finger(s).

4. The stabilizing controller of claim 1 wherein the resilient components have a ring shape.

5. The stabilizing controller of claim 1 further comprising two additional resilient components wherein:
   the first additional resilient component stabilizes the center post in relation to the handle and is in substantially constant contact with the handle; and
   the second additional resilient component is disposed around the center post and has a gap between it and the center post, until a tilt and/or roll maneuver is made sufficient for the second additional resilient component to contact the center post.

6. The stabilizing controller of claim 1:
   wherein rotational motion about the Z-axis about the center post is controlled by an assembly having:
   a pad ring non-rotationally attached to the outer gimbal ring;
   one or more paddles attached to the pad ring and extending radially outward from the pad ring;
   one or more pads formed of a resilient material attached to the handle and disposed between the paddles, with gaps between the paddles and the pads, such that when the handle is rotated with respect to the outer gimbal ring, the pads contact the paddles, thereby controlling the rotational motion about the Z-axis.

7. The stabilizing controller of claim 1 wherein the resilient component(s) comprise a resilient material disposed within the extended portion of the outer gimbal ring and positioned to engage with the center post when the outer gimbal ring is tilted from a plane perpendicular to the center post.

8. The stabilizing controller of claim 1 wherein the resilient component(s) comprise a compressible material disposed above the gimbal which controls motion of the gimbal when the outer gimbal ring is tilted from a plane perpendicular to the center post.

9. The stabilizing controller of claim 1 further comprising counterweight(s) disposed about the center post to position the center of balance of the device and stabilizing controller below the pivot center of a the gimbal assembly.

10. The stabilizing controller of claim 1 further comprising:
one or more foldable balancing arms.

11. The stabilizing controller of claim 10 wherein the balancing arms extend symmetrically from a stage on which the device can be attached, and in substantially the same plane, and further wherein the stage is foldable to the same or a parallel plane as the balancing arms.

12. The stabilizing controller of claim 1
wherein the gimbal assembly comprises:
a post mounting sleeve;
an inner gimbal ring; and
an outer gimbal ring;
wherein the post mounting sleeve is disposed around the center post and within the inner gimbal ring and is rotationally connected to the inner gimbal ring; and
the inner gimbal ring is disposed within and rotationally connected to the outer gimbal ring; and
wherein the handle is disposed around and is rotational connected to the gimbal assembly.

13. A method of balancing and stabilizing a device comprising:
attaching a device to a stabilizing controller according to claim 1.

14. The stabilizing controller of claim 1 configured for use with an image-capture device weighing in the range of about 0.2 lbs to about 1.5 lbs.

15. A stabilizing controller to balance, support and orient a device, the stabilizing controller comprising:
a gimbal assembly positioned at the center of balance of the stabilizing controller with the device attached;
a handle disposed around the gimbal assembly;
a center post coincident with the centerline balancing axis of the gimbal apparatus and having a longitudinal balancing axis Z, the center post attached such that motion about each of an X-axis, Y-axis, and the Z-axis, the three of which are mutually perpendicular to one another, is isolated from the motion of the other axes; and
one or more assemblies to control rotational motion about at least one of the X-axis, Y-axis, and Z-axis;
wherein rotational motion about the Z-axis about the center post is controlled by an assembly having one or more paddles extending radially with respect to the center post, and one or more resilient pads into which the paddles come into contact when the handle is rotated about the longitudinal axis of the center post.

16. A stabilizing controller to balance, support and orient a device, the stabilizing controller comprising:
a gimbal assembly positioned at the center of balance of the stabilizing controller with the device attached;
a handle disposed around the gimbal assembly;
the gimbal assembly comprising an outer gimbal ring;
a center post coincident with the centerline balancing axis of the gimbal apparatus and having a longitudinal balancing axis Z, the center post attached such that motion about each of an X-axis, Y-axis, and the Z-axis, the three of which are mutually perpendicular to one another, is isolated from the motion of the other axes;
one or more assemblies to control rotational motion about at least one of the X-axis, Y-axis, and Z-axis; and
wherein rotational motion about the Z-axis about the center post is controlled by an assembly having:
a pad ring non-rotationally attached to the outer gimbal ring;
one or more paddles attached to the pad ring and extending radially outward from the pad ring;
one or more pads formed of a resilient material attached to the handle and disposed between the paddles, with gaps between the paddles and the pads, such that when the handle is rotated with respect to the outer gimbal ring, the pads contact the paddles, thereby controlling the rotational motion about the Z-axis.

17. A stabilizing controller to balance, support and orient a device, the stabilizing controller comprising:
a gimbal assembly positioned at the center of balance of the stabilizing controller with the device attached, the gimbal assembly comprising an outer gimbal ring;
a handle disposed around the gimbal assembly;
a center post coincident with the centerline balancing axis of the gimbal apparatus and having a longitudinal balancing axis Z, the center post attached such that motion about each of an X-axis, Y-axis, and the Z-axis, the three of which are mutually perpendicular to one another, is isolated from the motion of the other axes;
one or more assemblies to control rotational motion about at least one of the X-axis, Y-axis, and Z-axis;
wherein:
the outer gimbal ring extends at least partially downward through the handle;
the handle has a device by which an operator can impede or stop the relative rotation of the handle with respect to the outer gimbal ring; and
wherein the device is an opening in the handle through which the operator can access the outer gimbal ring with the operator's finger(s).

18. A stabilizing controller comprising:
a holder to accommodate an image-capture device;
a stage attached to the holder at its bottom portion;
one or more balancing arms pivotable with respect to the stage and disposed in an open position in substantially the same plane as the holder, and pivotable within that plane;
a gimbal apparatus attached to the stage;
the gimbal apparatus comprising:
a gimbal assembly positioned at the center of balance of the stabilizing controller with the device attached;
a handle disposed around the gimbal assembly;
a center post coincident with the centerline balancing axis of the gimbal apparatus and having a longitudinal balancing axis Z, the center post attached such that motion about each of an X-axis, Y-axis, and the Z-axis, the three of which are mutually perpendicular to one another, is isolated from the motion of the other axes; and
one or more assemblies to control rotational motion about at least one of the X-axis, Y-axis, and Z-axis.
the holder foldable toward the gimbal apparatus and handle in its entirety;
the holder and arms foldable toward one another so they lie substantially flat against one another;
wherein when the apparatus is unfolded and an image capture device is disposed within the holder, the apparatus is substantially balanced and motion of a user holding the handle is isolated from the image capture device.

19. The stabilizing controller of claim 18 comprising two balancing arms wherein the arms' pivot ranges are symmetrical to one another.

20. The stabilizing controller of claim 18 wherein the stabilizing controller is configured for a specific imaging device.

21. The stabilizing controller of claim 18 further comprising the device.

22. The stabilizing controller of claim 21 wherein the device is an imaging device.

\* \* \* \* \*